United States Patent [19]

Tamura et al.

[11] Patent Number: 4,794,463

[45] Date of Patent: Dec. 27, 1988

[54] INK JET SYSTEM

[75] Inventors: Sakae Tamura, Chiba; Tsutomu Uehara, Yokosuka; Tetsuo Okuyama; Mutsuki Yamazaki, both of Yokohama, all of Japan

[73] Assignee: Kabushiki Kaisha Toshiba, Kawasaki, Japan

[21] Appl. No.: 118,883

[22] Filed: Nov. 10, 1987

[30] Foreign Application Priority Data

| | | | |
|---|---|---|---|
| Nov. 10, 1986 | [JP] | Japan | 61-265455 |
| Jun. 30, 1987 | [JP] | Japan | 62-163078 |
| Jun. 30, 1987 | [JP] | Japan | 62-163079 |

[51] Int. Cl.[4] .................... G01D 15/16

[52] U.S. Cl. .................... 358/296; 346/140 R

[58] Field of Search .................... 358/296; 346/140

[56] References Cited

U.S. PATENT DOCUMENTS

| | | | |
|---|---|---|---|
| 3,553,719 | 1/1971 | Miyazaki | 358/296 X |
| 4,271,416 | 6/1981 | Shimizu | 346/140 |

FOREIGN PATENT DOCUMENTS

| | | |
|---|---|---|
| 56170 | 1/1981 | Japan . |
| 564467 | 12/1981 | Japan . |
| 56-167476 | 12/1981 | Japan . |
| 60-250962 | 12/1985 | Japan . |

*Primary Examiner*—Joseph W. Hartary
*Attorney, Agent, or Firm*—Oblon, Fisher, Spivak, McClelland, & Maier

[57] ABSTRACT

In an ink jet system, first and second main electrodes are arranged on an insulating substrate board so as to be extended to one side of the board and connected to first and second auxiliary electrodes through photoconductive sections, respectively. An ink reservoir is formed on the board and an optical system is located above the photoconductive sections. First and second control electrodes are arranged along the one side of the board in an ink jet port of the reservoir so as to face the main electrodes. A back electrode is arranged as to face the ink jet port. First and second control pulse signals synchronized with each other and having pulse and negative polarities are supplied to the first and second control electrodes, first and second high voltage pulse signals synchronized with each other and having pulse and negative polarities are also supplied to the first and second auxiliary electrodes and another high voltage signal having a twice cycle period as that of the control pulse signal is supplied to the back electrode. The potentials on the main electrodes are varied according to the resistance of the photoconductive sections and an ink is jetted from the port to the back electrode when a predetermined potential difference between the main electrode and the back electrode is produced.

38 Claims, 13 Drawing Sheets

ELECTRODE POTENTIALS MEASURED WHEN PHOTOCONDUCTIVE SECTION IS ILLUMINATED BY LIGHT

INK JET SYSTEM

BACKGROUND OF THE INVENTION

This invention relates to an ink jet system having a slit-like ink jet port and, more particularly, to an ink jet printer of an electrostatic acceleration type.

Heretofore, there has been a well-known ink jet printer, which forms record dots on a recording medium by causing liquid ink to fly thereto. This ink jet produces less noise during the recording operation. In addition, since ink is caused to be attached directly to the recording sheet, neither developing nor fixing processes are necessary. However, the ink jet port is liable to be clogged due to drying and solidification of the liquid ink, leading to instable recording operation. Various techniques, therefore, have been studied to solve the above problem inherent in the ink jet printer as noted above. An ink jet printer having a sit-like ink jet port has been developed. In this case, the clogging of the ink jet port with ink is less likely to happen because the port is slit-like. For these reasons, this type of ink jet printer has been attracting interest.

In an electrostatic acceleration type ink jet printer using the slit-like ink jet port as noted above, a plurality of recording electrodes are provided on the inner surface of the slit-like ink jet port, which has a gap dimension of approximately 100 μm and a length of approximately 200 mm, at a density of approximately 8 electrodes per millimeter. When a high pulse voltage is applied to selected recording electrodes corresponding to printing points, a high electric field is produced between each selected recording electrode and a back electrode facing the ink jet port. As a result, ink in the vicinity of each selected recording electrode under the high applied voltage is caused by electrostatic forces to jet toward the back electrodes. In this way, dots of ink are produced on a recording sheet provided in front of the back electrode in correspondence to the recording signal.

As the method of applying a high pulse voltage to a plurality of selected recording electrodes, there is one, in which individual recording electrodes are connected to respective high voltage pulse generators and these high voltage pulse generators are driven selectively according to recording data. This method has a problem in that the recording electrodes and high voltage pulse generators have to be connected to one another by a large number of leads.

Japanese Patent Laid-Open Publication No. 60-250,962 discloses an improved printer system. In this system, individual recording electrodes are connected through respective photoconductive sections to a first common ink jet control electrode and are also connected through respective fixed resistors to a second common ink jet control electrode. A D.C. high voltage is applied between the first and second common flying control electrodes, and as an optical signal corresponding to recording data illuminates corresponding photoconductive sections the potential on each recording electrode is changed according to the recording data.

This system makes use of the fact that the resistance of each photoconductive section is varied according to the intensity of light incident on the photoconductive section to vary the voltage division ratio of a voltage divider constituted by the resistance between the first and second ink jet control electrodes, thus giving rise to a difference in potential between the recording electrodes connected to photoconductive sections which are illuminated by light and those which are not illuminated. More specifically, assuming that the electric resistance between the recording electrode and the first ink jet control electrode is changed from Rd to Rp with illumination of associated photoconductive section with a light signal, potential Vp on a recording electrode with the associated photoconductive section illuminated by light and potential Vd on a recording electrode not illuminated by light are given respectively as $$Vd = \frac{Rc - Rd}{Rc + Rd} \cdot V_1 \quad (1)$$

$$Vp = \frac{Rc - Rp}{Rc + Rp} \cdot V_1 \quad (2)$$

where Rc is the constant electric resistance between the recording electrode and the second ink jet control electrode, $+V_1$ is the voltage applied to the first ink flying control electrode, and $-V_1$ is the voltage applied to the second ink flying control electrode.

Change ΔV in the recording electrode potential before and after the illumination of the photoconductive section with the light signal is thus expressed as $$\begin{aligned} \Delta V &= Vp - Vd \\ &= \frac{2Rc(Rd - Rp)}{(Rc + Rp)(Rc + Rd)} \times V_1 \end{aligned} \quad (3)$$

Thus, the jetting of ink is controlled according to the optical signal by adjusting $V_1$, Rc, Rd and Rd such that ΔV has a predetermined value.

The recording system which permits control of the jetting of ink with the illumination of the photoconductive sections with an optical signal as noted above, has a possibility that it permits provision of a new copier, which does not require complicated mechanisms for developing, fixing and other steps as are necessary in the ordinary electrophotographic duplicator or the like, and the provision of a practical system has been desired.

In the ink jet recording system as noted above, as is obvious from equation 3, the change ΔV in the recording electrode potential is increased in proportion to the voltage $2V_1$ applied between the first and second high voltage application electrodes. The potential difference between the recording electrode and the back electrode thus can be increased at the time of the jetting of ink, thus increasing the electrostatic force given to ink. However, the photoconductive sections and fixed resistors provided between the recording electrodes and high voltage application electrodes have breakdown voltage limitations, so that a limitation is imposed on the recording electrode potential change ΔV. Therefore, it is necessary to make the distance between the ink jet port and back electrode to be sufficiently small. However, if the distance between the ink jet port and back electrode is too small, there arises a problem that ink is attached continuously to the recording sheet. Even where the distance between the ink jet port and back electrode is appropriately set, if a physical property of ink such as the surface tension thereof is changed, the properties of the ink jet printer are changed to give rise to the problem noted above.

The ink jet recording system noted above has a further problem in the case when ink is jetted simultaneously from adjacent ones of a plurality of recording electrodes provided on the inner surface of the slit-like ink jet port. In such a case, adjacent ink jet toward the recording sheet exert electrostatic forces of repulsion to one another. This results in a disturbance of the direction of the ink jet, thus spoiling the quality of the produced copy image. This problem is also posed in the system where a signal is applied to recording electrodes by selectively driving high voltage pulse generators. In a system disclosed in Japanese Patent Laid-Open Publication No. 56-167,476, the above problem is solved by providing a shift of high recording pulse voltage application timing between most adjacent recording electrodes.

In a recording system, in which the jetting of ink is controlled by leading light reflected from an original directly to photoconductive sections, however, it is thought to be impossible to provide a shift in the high pulse voltage application timing between adjacent recording electrodes. More specifically, in an ink jet system, which has a slit-like ink jet port and is provided with a circuitry including photoconductive sections, there is a problem that ink jets from adjacent recording electrodes exert electrostatic forces of repulsion on one another and disturb the direction of the ink jet, thus spoiling the quality of the record image.

Meanwhile, ink jets are accelerated from the slit-like ink jet port toward the back electrode by the potential difference between the recording electrode and the back electrode. This potential difference is influenced by various factors such as the distance between the ink jet port and back electrode, applied pulse voltage and surface tension of the ink drop, but, roughly, it is required to be as high as 1 to 3 kV. Therefore, the prior art ink jet recorder of this type is prone to an occurrence of spark discharge between the recording electrode and the back electrode, and the ends of the recording electrodes are liable to be broken by spark discharge. The phenomenon of spark discharge will be described in further detail. Ink in the vicinity of the slit-like ink jet port experiences a pulling force, which is produced by the high pulse voltage application and tends to pull ink toward the back electrode, and a surface tension, which tends to pull ink back toward the ink jet port. These two different forces are exerted and in opposite directions. Consequently, a wave is produced on the surface of the ink in the ink jet port, and there are instances in which the ends of the recording electrodes are not covered by ink. This promotes the occurrence of spark discharge. When a spark discharge occurs, the ends of the recording electrodes are broken, resulting in an increase of the distance between recording electrode and back electrode beyond a predetermined value. Consequently, failure of flying of ink results, giving rise to deterioration of image quality with time.

SUMMARY OF THE INVENTION

An object of the invention is to provide an ink jet system of an electrostatic acceleration type having a slit-like ink jet port and using a photoconductor, which permits high quality recording.

Another object of the invention is to provide an ink jet recorder of an electrostatic acceleration type having a slit-like ink jet port and using a photoconductor, which eliminates simultaneous jetting of ihk from adjacent recording electrodes to permit high quality recording.

Further, an object of the invention is to provide an ink jet recorder of an electrostatic acceleration type, which eliminates spark discharge between a recording electrode and a back electrode so that recording free from deterioration with time can be attained.

According to the invention, there is provided an ink jet system comprising:

an insulating substrate board having one end;

a plurality of main electrodes formed on said insulating substrate board such that they extend toward said end;

means, disposed on said substrate board, for defining an ink reservoir accommodating ink and a slit-like ink jet port communicating with said ink reservoir and extending along said end of said insulating substrate board;

a control electrode facing said main electrodes in said ink reservoir and extending along said end of said insulating substrate board;

auxiliary electrode means arranged corresponding to said main electrodes and extending on said substrate board outside said ink reservoir;

photoconductive members provided on said substrate board and connecting said main electrodes to said auxiliary electrode outside said ink reservoir and providing resistance capable of being changed when said members are exposed to light;

back electrode means facing said ink jet port via a gap, ink being jetted from said ink jet port through said gap; and mean for supplying voltage signals to said control electrode, auxiliary electrode and back electrode means, a voltage signal having a periodically varying level being supplied to one of said control electrode and auxiliary electrode, the potential on main electrodes being varied according to voltage signals supplied to said control electrode and auxiliary electrode, ink on said main electrodes being jetted toward said back electrode when a predetermined value is reached by the potential difference between the potential on said back electrode means and potential on said main electrodes.

According to the invention, there is also provided the ink jet system comprising:

an insulating substrate board having one end;

first and second main electrodes formed on said substrate board such that they extend toward said end, said first and second main electrode being arranged alternately;

means, disposed on said substrate board, for defining an ink reservoir accommodating ink and an ink jet port communicaiing with said ink reservoir and extending along one end of said insulating substrate board;

first and second control electrodes facing said main electrodes via ink in said ink reservoir and extending along said end of said insulating substrate board;

means for providing predetermined resistance having values R11, R12, R22 and R21 between first and second main electrodes and said first and second control electrodes, the resistance R11 between the first main electrode and said first control electrode being lower than the resistance R12 between the first main electrode and said second control electrode, the resistnnce R22 between the second main electrode and second control electrode being lower than the resistance R21 between the second main electrode and said first control electrode;

first and second auxiliary electrodes provided in correspondence to the first and second main electrodes, respectively and extending on said substrate board outside said ink reservoir;

photoconductive members provided on said substrate board for connecting said main electrodes to auxiliary electrodes outside said ink reservoir, the resistance of said photoconductive members being changed when said members are exposed to light;

back electrode means facing said ink jet port via a gap, ink being jetted from said ink jet port through said gap;

control pulse signal generating means for supplying first and second control pulse signals to said first and second control electrodes, said first and second control pulse signals being 180-degrees out-of-phase with respect to each other and having the same and reversed polarities, respectively;

means for supplying first and second reference pulse signals to said first and second auxiliary electrodes, respectively said first and second reference pulse signals being 180-degrees out-of-phase with respect to each other and having reverse polarities to that of said first and second control pulse signals; and means for supplying a high voltage signal to said back electrode means, potentials on the first and second main electrodes being varied in 180-degree out-of-phase relation to each other according to the voltage signals supplied to said control electrodes and auxiliary electrodes, ink on said main electrodes being jetted as particles toward the back electrode when a predetermined value is reached by the potential difference between the potentials on said back electrode means and potential on the main electrodes.

Furthermore, according to the invention, there is provided the ink jet system comprising:

an insulating substrate board having one end;

first and second main electrodes disposed on said substrate board such that they extend toward said end, said first and second main electrodes being arranged alternately;

means, disposed on said substrate board, for defining an ink reservoir accommodation ink and an ink jet port communicating with said ink reservoir communicating with said ink reservoir and extending along one end of said insulating substrate board;

first and second control electrodes facing said main electrodes via ink in said ink reservoir and extending along said end of said insulating substrate board;

means for providing predetermined resistances having values R11, R12, R22 and R21 between first and second main electrodes and said first and second control electrodes, the resistance R11 between the main electrodes in said first group and said first control electrode being lower than the resistance R12 between the first main electrode and said second control electrode, the resistance R21 between the second main electrodes and said first control electrode being higher than the resistance R22 between the main second electrode and said second control electrode;

first and second auxiliary electrodes provided in correspondence to the first and second main electrodes, respectively and extending on said substrate board outside said ink reservoir;

photoconductive members provided on said substrate board for connecting said main electrodes to auxiliary electrodes outside said ink reservoir, the resistance of said photoconductive members being changed when said members are exposed to light;

back electrode means facing said ink jet port via a gap, ink being jet from said ink jet port through said gap;

means for supplying a reference pulse signal to each of said first and second auxiliary electrode means;

control pulse signal generating means for supplying first and second control pulse signals to said first and second control electrodes, said first and second control pulse signals being out-of-phase in phase difference corresponding to the cycle period of said reference signal and having reverse polarities to said reference signal; and means for supplying a high voltage signal to said back electrode means, potentials on the first and second main electrodes being varied in 180-degree out-of-phase relation to each other according to the voltage signals supplied to said control electrodes auxiliary electrodes, ink on said main electrodes being jetting toward the back electrode when a predetermined value is reached by the potential difference between the potentials on said back electrode means and potential on the main electrodes.

DETAILED DESCRIPTION OF THE PREFERRED EMBODIMENT

Figure 1:
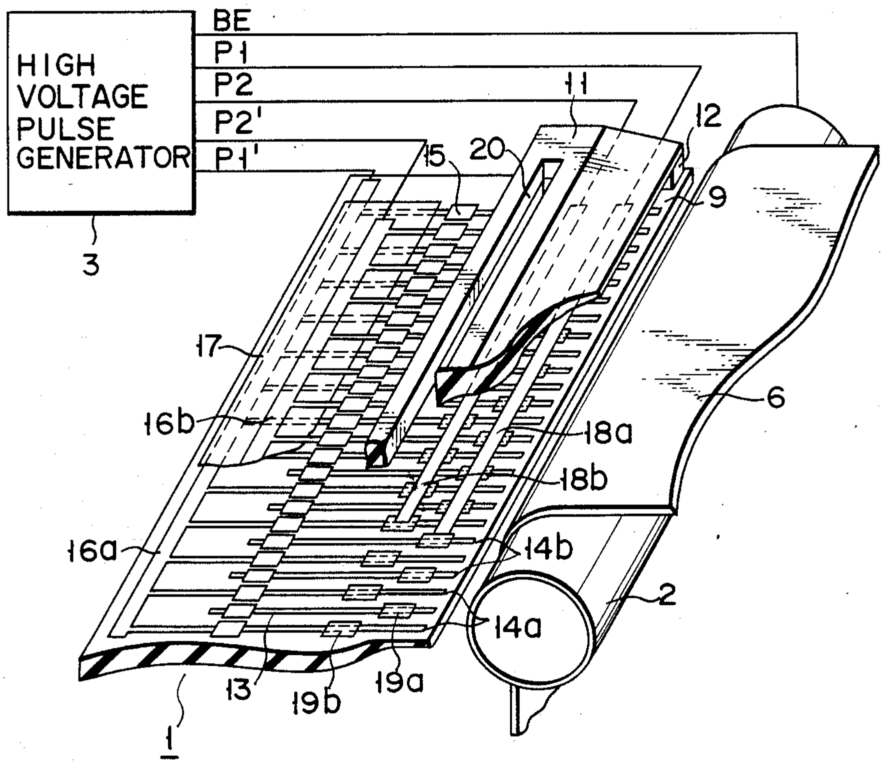
FIG. 1 is a perspective view, partly broken away, showing an embodiment of the electrostatic acceleration type ink jet recorder according to the invention.
Figure 2:
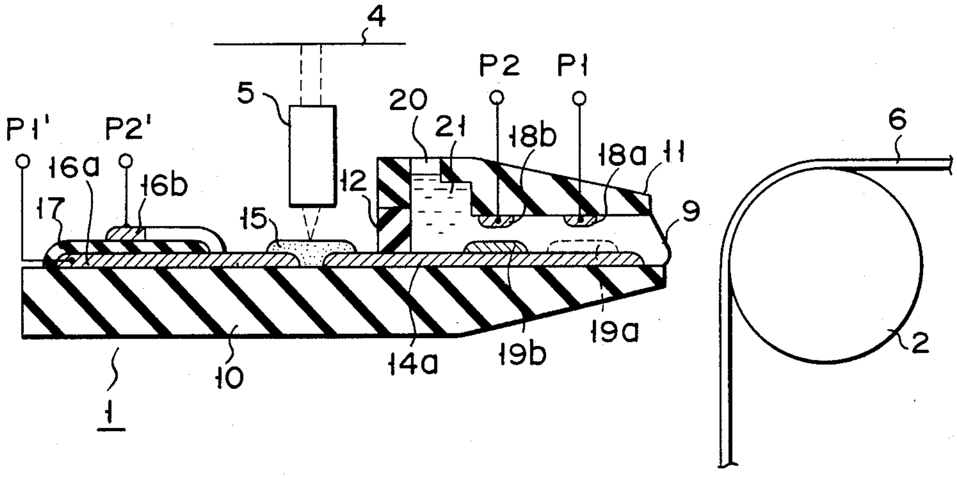
FIG. 2 is a schematic sectional view showing the recorder shown in FIG. 1.

FIGS. 1 and 2 illustrate an embodiment of the ink jet system according to the invention. The system comprises ink jet head 1 with slit-like ink jet port 9, cylindrical back electrode 2 facing slit-like ink jet port 9 at a predetermined gap therefrom, high voltage pulse generator 3 for applying a predetermined high voltage pulse to ink jet head 1 and optical system 5 for leading light reflected from original 4 as a recording signal to ink recording head 1.

Ink recording head 1 has a structure consisting of substrate board 10 and upper board 11 overlapped over each other via spacer 12 and defining slit-like ink jet port 9 between boards 10 and 11. On the surface of substrate board 10 facing upper board 11, a plurality of recording electrodes 13 are provided in a row at a predetermined interval such that they extent up to the proximity of ink jet port 9.

The plurality of recording electrodes 13 belong to either one of two groups, the recording electrodes in each group being not adjacent to any recording electrode in the other group, e.g., first recording electrode group 14*a* consisting of odd recording electrodes and second recording electrode group 14*b* consisting of even recording electrodes. The recording electrode in first group 14*a* are connected through photoconductive sections 15 to respective sections of comb-like first auxiliary electrode 16*a* formed on substrate board 10. Likewise, the recording electrodes in second group 14*b* are connected through photoconductive sections 15 to respective sections of comb-like second auxiliary electrode 16*b* formed on substrate board 10 via insulating layer 17. Comb-like first auxiliary electrode 16*a* is covered except for a portion, to which power is supplied, and end portions of the individual sections by insulating film 17. Comb-like second auxiliary electrode 16*b* is formed on insulating film 17 such that sections of comb-like first and second auxiliary electrodes 16*a* and 16*b* are shifted relative to one another in plan view. Two auxiliary electrodes 16*a* and 16*b* are electrically insulated from one another by insulating film 17.

First and second parallel ink jet control electrodes 18*a* and 18*b* are provided on the surface of upper board 11 facing substrate board 10 such that they extend at right angles to recording electrodes 13. First resistor films 19*a* are formed on portions of second recording electrode group 14*b* facing first high voltage electrode 18*a* to increase the resistance between the two electrodes. Second resistor film 19*b* is formed on portions of first recording electrode group 14*a* facing second ink jet control electrode 18*b* to increase the resistance between the two electrodes. Upper board 11, substrate board 10 and spacer 12 define an ink reservoir 20. Oily ink 21 is contained in ink reservoir 20.

The resistances of oily ink 21 and photoconductive sections 15 are set as follows. The resistivity of oily ink 21, thickness of the layer of oily ink 21 between electrodes and resistances of first and second resistor films 19*a* and 19*b* are set such that they will meet a relation $$Rp<Rc11=Rc22<Rc12=Rc21=Rd \quad (4)$$

where Rc11 is the resistance between first ink jet control electrode 18*a* and recording electrode which belongs to first recording electrode group 14*a*, Rc21 is the resistance between first ink jet control electrode 18*a* and recording electrode which belongs to second recording electrode group 14*b*, Rc12 is the resistance between second ink jet control electrode 18*b* and recording electrode which belongs to first recording electrode group 14*a*, Rc22 is the resistance between second ink jet control electrode 18*b* and recording electrode which belong to second recording electrode group 14*b*, Rp is the resistance of photoconductive sections 15 when the section is illuminated by light, and Rd is the resistance of photoconductive sections 15 when the section is not illuminated by light.

Figure 3:
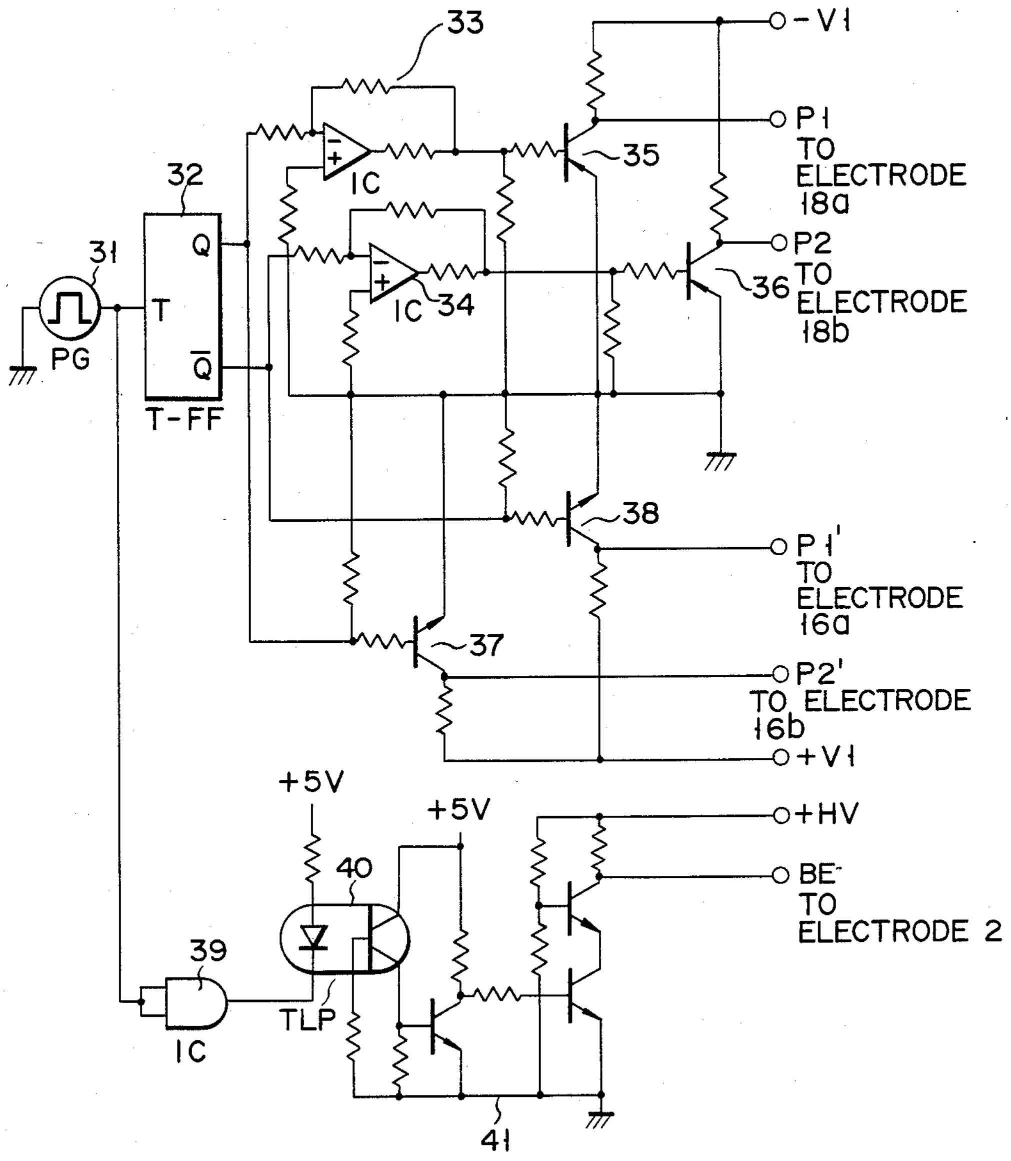
FIG. 3 is a circuit diagram showing a high voltage pulse generator shown in FIG. 1.
Figure 4:
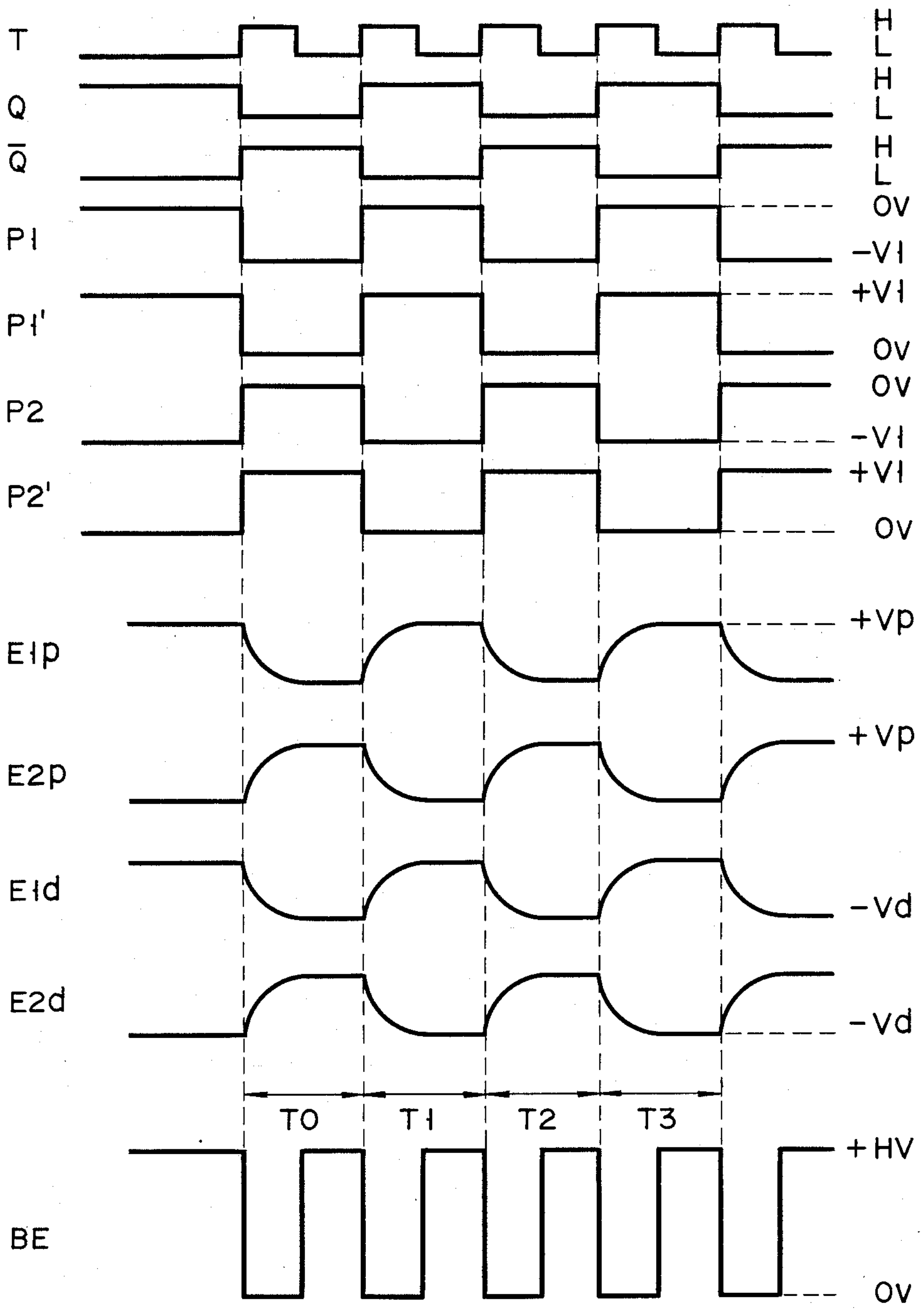
FIG. 4 is a waveform diagram showing waveforms involved in various parts of the circuit shown in FIG. 3.

Ink jet control pulse generator 3 specifically has a circuit construction as shown in FIG. 3. A reference pulse signal labeled T in FIG. 4 is generated from pulse generator 31 and supplied to toggle terminal T of T-type flip-flop 32. T-type flip-flop 32 provides inverted output from its Q and $\overline{Q}$ terminals with the rising of reference pulse signal T. Thus, pulse signals having twice cycle period of reference pulse signal T and 180 degrees out of phase from one another as shown in FIG. 4, are provided from the Q and $\overline{Q}$ terminals of T-type flip-flop 32. The Q and $\overline{Q}$ outputs are amplified by respective operational amplifiers 33 and 34 before being supplied to the bases of power transistors 35 and 36, each of which has the emitter grounded and the collector connected through a resistor to a power supply of $-V$. Power transistors 35 and 36 are thus on-off operated according to the Q and $\overline{Q}$ outputs. Thus, they provided from their collectors first high voltage pulse signals $P_1$ and $P_2$ which are 180 degrees out of phase with each other and are changed between 0 and $-V_1$ volts. The Q and $\overline{Q}$ outputs are also supplied to the bases of power transistors 37 and 38, each of which has the emitter grounded and the collector connected through a resistor to a power supply of $+V$. Power transistors 37 and 38 are thus on-off operated according to the Q and $\overline{Q}$ outputs to provided, from their collectors, second high voltage pulse signals $P_1'$ and $P_2'$ which are 180 degrees out of phase with each other and are changed between 0 and $V_1$ volts. Reference pulse signal T from pulse generator 31 is supplied through buffer 39 and photocoupler 40 to amplifier 41 for conversion into a high voltage pulse signal at double the frequency of high voltage pulse signals $P_1$, $P_1'$, $P_2$ and $P_2'$. High voltage pulse signals $P_1$, $P_1'$, $P_2$, $P_2'$ and BE are applied respectively to first ink jet control electrode 18*a*, first auxiliary electrode 16*a*, second ink jet control electrode 18*b*, second auxiliary electrode 16*b* and back electrode 2.

Figure 5A:
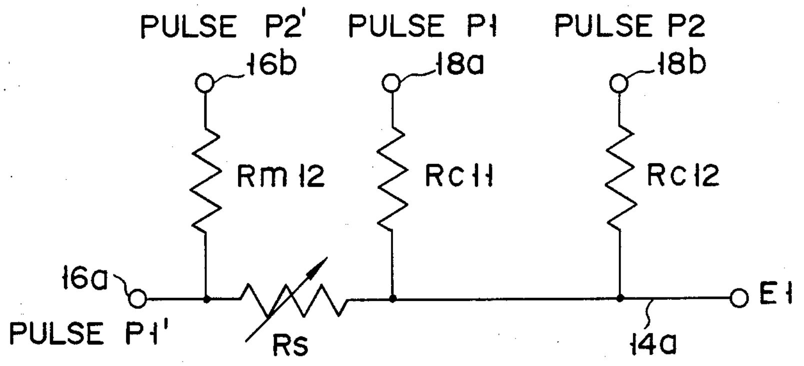
FIGS. 5A and 5B are circuit diagrams showing equivalent circuits concerning first and second auxiliary electrode, recording electrodes and first and second ink flying control electrodes in the recorder shown in FIG. 1.
Figure 5B:
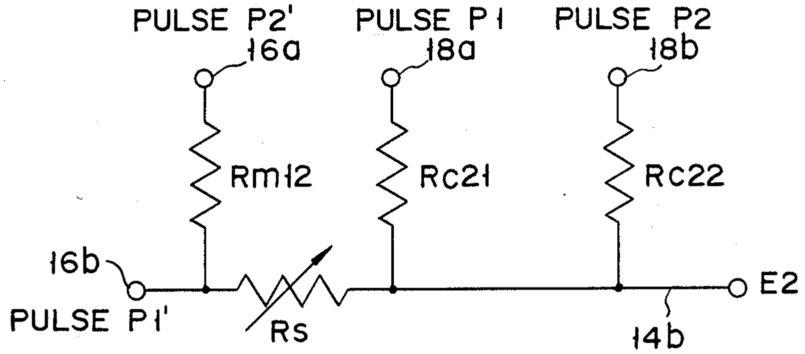

Denoting the resistance between first and second auxiliary electrodes 16*a* and 16*b* by Rm12 and the resistance of photoconductive sections 15 not illuminated by light by Rs, we have equivalent circuits as shown in FIGS. 5A and 5B respectively for first and second recording electrode groups 14*a* and 14*b*.

Considering period T0 in FIG. 4, since high voltage pulses $P_1'$ and $P_2$ applied to auxiliary electrode 16*a* and ink jet control electrode 18*b* are 0 and high voltage pulse $P_1$ applied to ink jet control electrode 18*a* is $-V_1$, potential E1*d* on first recording electrode group 14*a*, from the voltage division ratio between the resultant resistance of Rc12 and Rs and resistance of RC11, is expressed as $$E1d(T0) = \frac{RsRc12(V_1)}{Rs(Rc11 + Rc12) + Rc11\,Rc12} \quad (5)$$

Likewise, since high voltage pulse $P_1$ applied to ink jet control electrode 18a is $-V_1$, high voltage pulses $P_1'$ and $P_2$ applied to auxiliary electrode 16a and ink jet control electrode 18b are 0 and high voltage pulse $P_2'$ applied to auxiliary electrode 16b is $+V_1$ in FIG. 5(b), potential E2 on second recording electrode group 14b during period T0 is $$E2d(T0) = \frac{Rc22(Rc21 - Rs)V_1}{Rs(Rc22 + Rc21) + Rc22\,Rc21} \quad (6)$$

Now considering period T1 in FIG. 4, since high voltage pulses $P_1$ and $P_1'$ applied to ink jet control electrode 18a and auxiliary electrode 16b are 0, high voltage pulse $P_2$ applied to ink jet control electrode 18b is $-V_1$ and high voltage pulse $P_1'$ applied to auxiliary electrode 16a is $+V_1$ in FIG. 5A, potential E1*d* on first recording electrode group 14a is $$E1d(T1) = \frac{Rc11(Rc12 - Rs)V_1}{Rs(Rc11 + Rc12) + Rc11\,Rc12} \quad (7)$$

Likewise, since high voltage pulse $P_2$ applied to ink jet control electrode 18b is $-V_1$ and high voltage pulses $P_1$ and $P_2'$ applied to ink jet control electrode 18a and auxiliary electrode 16b are 0 in FIG. 5B, potential E2*d* on second recording electrode group 14b during period T1 is $$E2d(T1) = \frac{Rs\,Rc21(-V_1)}{Rs(Rc22 + Rc21) + Rc22\,Rc21} \quad (8)$$

Since Rc11=Rc22 and Rc12=Rc21, from equations 5 to 8 we can obtain relations $$E1(TO)=E2(T1)=E1(T2)=E2(T3)<0$$

$$E2(T0)=E1(T1)=E2(T2)=E1(T3)>0$$

The values of equations 5 and 8 are negative at all time, and the maximum absolute value is obtained when Rs=Rd, i.e., when photoconductive sections 15 are not illuminated by light. The minimum absolute value is obtained when Rs=Rp, i.e., when photoconductive section 15 are illuminated by light. Since Rp<<Rc12=Rc21=Rd, the values of equations 6 and 7 are either positive or zero. Thus, when photoconductive sections 15 are not illuminated by light, potential E11 on first recording electrode group 14a assumes a maximum negative value during periods T0 and T2 in FIG. 4. At this time, potential E2 on second recording electrode group 14b, which is obtained by substituting Rd for Rs in equation 6, is substantially 0. When photoconductive sections 15 are not illuminated by light, potential E2*d* on recording electrodes belonging to second recording electrode groups 14b assumes a maximum negative value during periods T1 and T3 in FIG. 4. At this time, potential E1*d* on first recording electrode group 14a is substantially 0. In FIG. 4, signal waveforms E1*p* and E2*p* are of the potentials on recording electrode groups 14a and 14b when photoconductive sections 15 are illuminated by light.

Figure 6A:
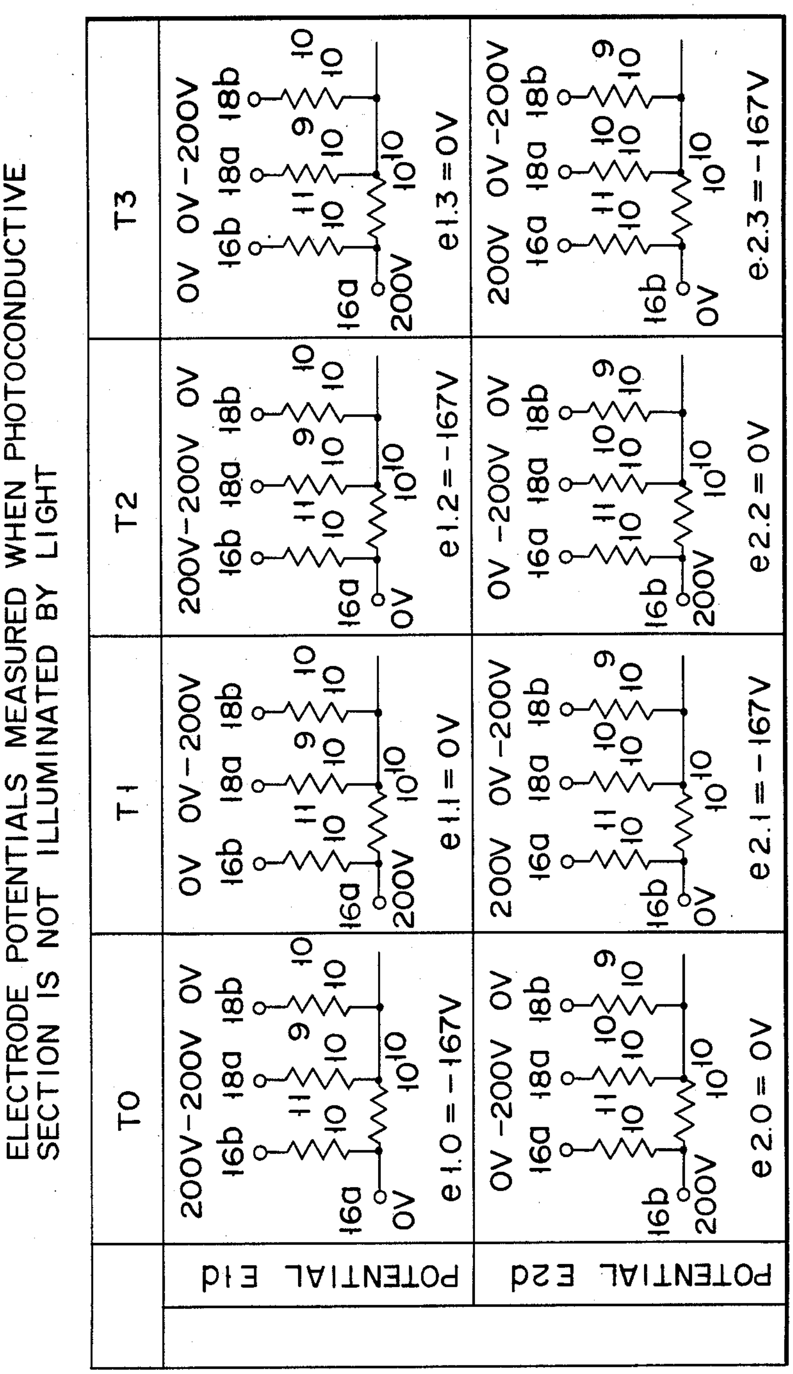
FIGS. 6A and 6B are views potentials on recording electrode groups when specific numerical values are substituted for the equivalent circuits shown in FIGS. 5A and 5B.
Figure 6B:
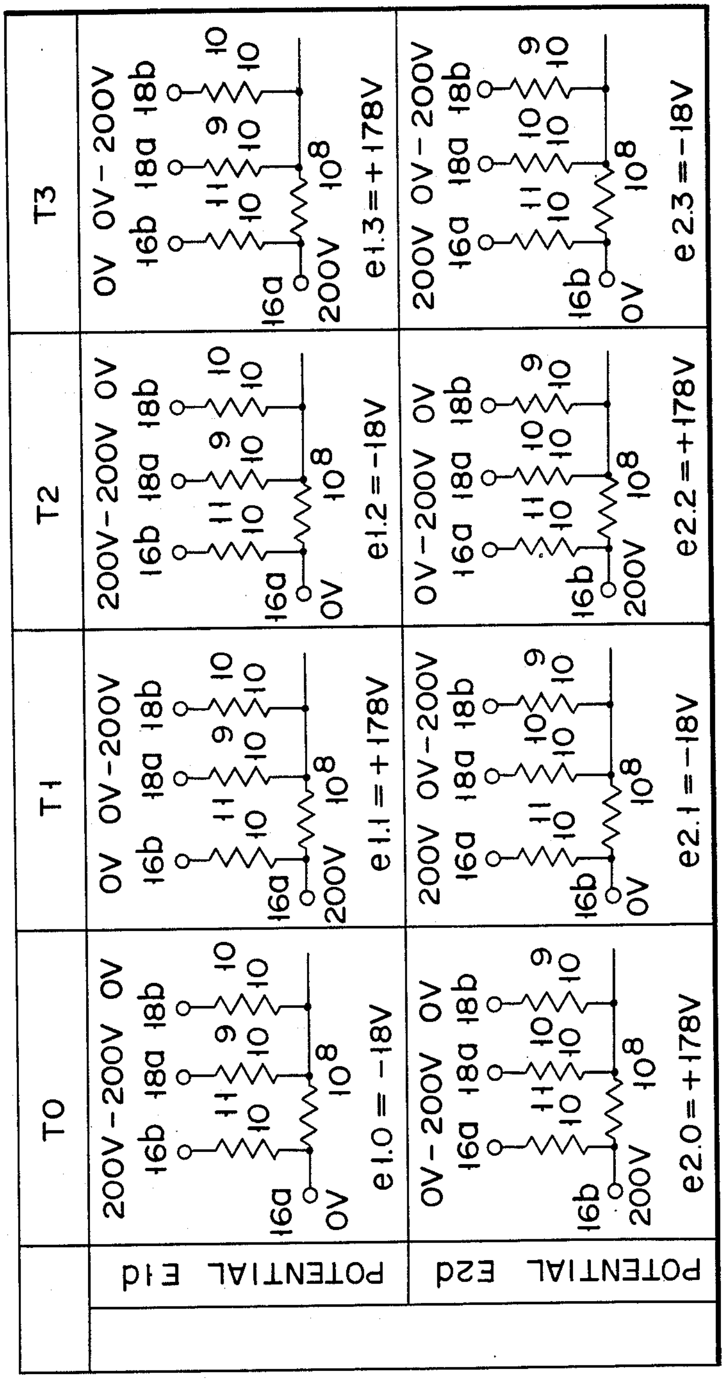

FIGS. 6A and 6B show the potentials on the recording electrode groups when Rp=$10^8$ Ω, Rc11=Rc22=$10^9$ Ω, Rc12=Rc21=Rd=$10^{10}$ Ω, the peak value of high voltage pulses $P_1$ and $P_2$ applied to ink jet control electrodes 18a and 18b is −200 V and the peak value of high voltage pulses $P_1'$ and $P_2'$ applied to auxiliary electrodes 16a and 16b is +200 V. When photoconductive sections 15 are not illuminated by light, potentials E1*d* and E2*d* on first and second recording electrode groups 14a and 14b alternatively assume the maximum negative value as shown in FIG. 6A. When photoconductive sections 15 are illuminated by light, potentials E2*d* and E1*d* on second and first recording electrode groups 14b and 14a alternatively assume the positive maximum value.

The cycle period of application of high voltage pulse BE to back electrode 2 is on half that of high voltage pulses $P_1$, $P_2$, $P_1'$ and $R_2'$, as shown in FIG. 4. Therefore, if photoconductive sections 15 are not illuminated by light, with the rising of pulse BE the potential difference between first recording electrode group 14a and back electrode 2 becomes maximum during periods T0 and T2, while the potential different between second recording electrode group 14b and back electrode 2 is maximum during periods T1 and T3. Thus oily ink 21 which is negatively charged is attracted to back electrode 2 by electrostatic forces alternately from first and second recording electrode groups 14a and 14b.

As is shown, with the ink jet system according to the invention, the even and odd electrode groups in a plurality of recording electrodes arranged at a density of approximately 8 electrodes per mm in slit-like ink jet port 9 are driven alternatively to jet ink. It is thus possible to prevent ink from being jet from adjacent recording electrodes so as to disturb the direction of jetting of ink by electrostatic forces of repulsion acting on one another. In other words, ink will never be jet simultaneously from adjacent recording electrodes, so that there arises no problem of image deterioration due to repulsive forces of ink drops.

Further, according to the invention in-phase high voltage pulse signals 180 degrees out of phase with respect to each other are applied respectively to first and second auxiliary electrodes 18a and 18b corresponding to control electrodes 18a and 18b. It is thus possible to increase the changes in the potentials on recording electrodes 16a and 16b without any breakdown caused in photoconductive sections 15, fixed resistors, etc. Denoting the resistance between each of auxiliary electrodes 16a and 16b and the corresponding ones of recording electrodes 14a and 14b and the resistance between each of recording electrodes 14a and 14b and the corresponding one of control electrodes 18a and 18b in the absence of light illuminating photoconductive sections 15 respectively by Rd and Rc, recording electrode potential $V_1d$ when high voltage $V_1$ is applied to auxiliary electrodes 16a and 16b is given as $$V_1d = \frac{Rc}{Rc + Rd} \times V_1 \quad (9)$$

Also, recording electrode potential $V_2d$ when high voltage $-V_1$ is applied to control electrodes 18a and 18b is given as $$V_1d = \frac{Rd}{Rc + Rd} \times V_1 \quad (10)$$

In the case of the presence of light illuminating photoconductive sections 15, with the resistance between each of auxiliary electrodes 16a and 16d and the corresponding one of recording electrodes 14a and 14b being reduced from Rd to Rp, recording electrode potential $V_{1p}$ when high voltage $V_1$ is applied to auxiliary electrodes 16_a_ and 16_b_ and recording electrode potential $V_{2p}$ when high voltage $-V_1$ is applied to control electrodes 18_a_ and 18_b_ are given respectively as $$V_{1p} = \frac{Rc}{Rc + Rp} \times V_1 \quad (12)$$

$$V_{2p} = \frac{-Rp}{Rc + Rp} \times V_1 \quad (9)$$

Change $\Delta V'$ in the recording electrode potential is given as $$\Delta V' = V_{1p} - V_{2d} = \frac{Rc(Rc + Rd) + Rd(Rc + Rp)}{(Rc + Rp)(Rc + Rd)} \times V_1 \quad (13)$$

As is obvious from comparison of equation 13 to equation 3, recording electrode potential change $\Delta V$ can be made sufficiently large compared to the prior art case. It is thus possible to set the distance between the ink jet port and back electrode to be sufficiently large compared to the case of the prior art. This means that it is possible to form ink dots faith-fully on the recording sheet according to an optical signal for recording.

Now, preferred examples of the system attained by the inventors will be explained.

EXAMPLE 1

Recording electrodes 13, auxiliary electrodes 16_a_ and 16_b_, photoconductive sections 15, resistor films 19_a_ and 19_b_ and insulating film 17 were provided on substrate board 10 consisting of a 2-mm thick glass plate processed to a predetermined shape, and then upper board 11 with ink jet control electrodes 18_a_ and 18_b_ and ink reservoir 20 provided in advance was overlapped via spacer 12 over and integrated with substrate board 10, thus obtaining ink recording head 1.

Figure 7A:
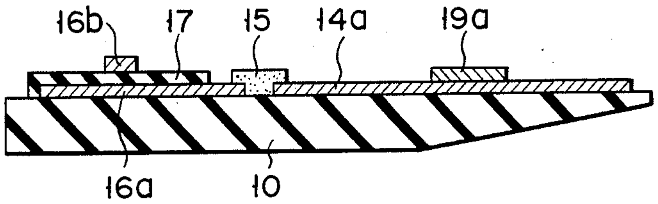
FIGS. 7A, 7B and 7C are views for explaining the process of fabrication of the slit-like ink jet port shown in FIG. 1.
Figure 7B:
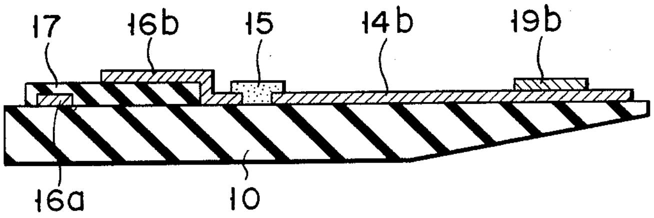

Substrate board 10 consisted of a rectangular glass plate with a short side dimension of 50 mm and a long side dimension of 80 mm, with one long side having a wedge-like pointed sectional profile with an angle of approximately 15°, as shown in FIG. 7A, formed by polishing from one side.

Upper board 11, like substrate board 10, consisted of a 2-mm thick rectangular glass plate with a short side dimension of 20 mm and a long side dimension of 100 mm and had a wedge-shaped long side obtained by polishing. It was also formed with a rectangular hole with a short side dimension of 2 mm and along side dimension of 50 mm, the hole serving as ink reservoir 20.

Part of recording electrodes 13 and auxiliary electrodes 16_a_ and 16_b_, was formed by etching a 1,500 Å metallic chromium film formed on one principal surface of substrate board 10 using a vacuum deposition apparatus.

As is seen from FIGS. 1, 2 and 7A and 7B, the etching was performed such that each recording electrode 13 had its front and rear ends were respectively spaced apart by approximately 10 μm and 25 mm from the wedgeshaped edge of substrate board 10 and that also the distance from the rear end of first recording electrode group 14_a_ to the front end of sections of comb-like auxiliary electrode 16_a_ and the distance from the rear end of second recording electrode group 14_b_ to the front end of sections of comb-like auxiliary electrode 16_b_ were both 40 μm.

The width of recording electrodes 13 was set to 60 μm, and the pitch of arrangement of recording electrodes 13 was 125 μm.

Figure 8:
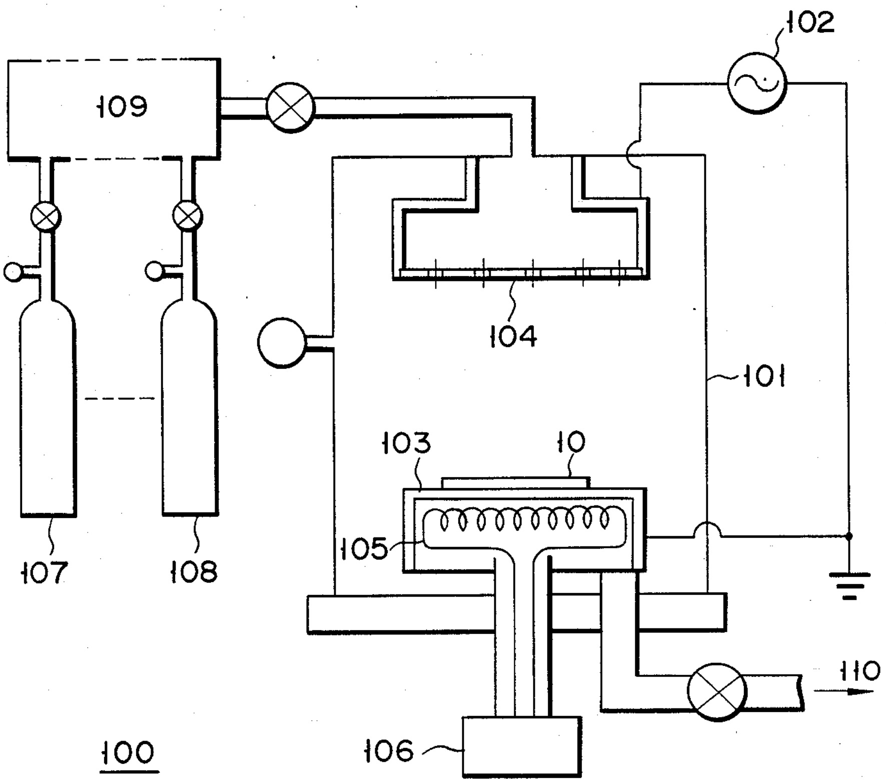
FIG. 8 is a view showing a glow discharge apparatus for manufacturing the photoconductive sections shown in FIG. 1.

After the formation of part of recording electrodes 13 and auxiliary electrodes 16_a_ and 16_b_ on substrate board 10, a nitrogen-containing amorphous silicon (a—Si:N) film was formed using glow discharge apparatus 100 as shown in FIG. 8, and then it was etched to form resistor films 19_a_ and 19_b_ and insulating film 17.

The a—Si:N film was formed as follows. First, substrate board 10 was placed on sample support 103 also serving as glow discharge electrode provided in reaction vessel 101 of apparatus 100. Then, after evacuating reaction vessel 101, silane gas ($SiH_4$) and nitrogen gas ($N_2$) were introduced in a volume ratio of approximately 1:6 from silane gas bomb 107 and nitrogen gas bomb 108, respectively, through gas mixer 109 into reaction vessel 101, and with the gas pressure in reaction vessel 101 held at approximately 1 Torr a glow discharge was induced by supplying high frequency power at a frequency of 13.56 MHz between planar electrode 104 and sample support 103 provided in reaction vessel 101. In this way, the a—Si:N film was formed as a product of a plastic reaction between the silane gas and nitrogen gas on substrate board 10. The film thus formed had a thickness of approximately 4 μm.

The unnecessary portion of the a—Si:N film formed on substrate board 10 was etched off as follows. A resist film was formed on the a—Si:N film, then substrate board 10 was placed again on sample support 103 of glow discharge apparatus as shown in FIG. 8, and a glow discharge was induced by introducing a mixture gas consisting of tetrafluoride methane gas ($CF_4$) and oxygen gas into reaction vessel 101.

Auxiliary electrode 16_b_ was formed by vacuum depositing, after the provision of resistor films 19_a_ and 19_b_ and insulating film 17 by the above process, a metallic chromium film on insulating film 17 and then etching the film.

Subsequently, photoconductive films 15 were formed by depositing hydrated amorphous silicon (a—Si:H) using glow discharge apparatus 100 as in the case of the formation of the a—Si:N film. More specifically, the a—Si:H was formed to a thickness of 2 μm such that it bridges the end of each section of each of comb-like auxiliary electrodes 16_a_ and 16_b_ and the associated rear end of recording electrodes 13.

During the deposition, the silane gas was introduced into reaction vessel 101 at a rate of 100 cc/min., the pressure in reaction vessel 101 was set to 1 Torr, high frequency power of 200 W was used, and substrate board 10 was heated for the deposition of a—Si:H to a temperature of 250° C. using heater 105.

A a—Si:H film which was obtained by deposition on substrate board 10 for 15 minutes under the conditions noted above, had a thickness of approximately 2.0 μm. The resistance between auxiliary electrode 16_a_ and first recording electrode group 14_a_ formed on substrate board 10 with a—Si:H and the resistance between auxiliary electrode 16_b_ and second recording electrode group 14_b_, were approximately $10^8\ \Omega$ under an illumination intensity of 100 lux and approximately $10^{11}\ \Omega$ in the absence of illuminating light.

Figure 7C:
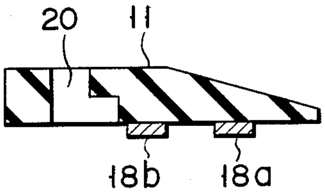

Subsequently, 3 mm wide first and second ink jet control electrodes 18_a_ and 18_b_ were provided such that they were parallel and spaced apart respectively by 2 and 8 mm from the wedge-shaped edge of upper board 11 (FIG. 7C). Thus, when upper board 11 and substrate board 10 were overlapped such that their wedge-shaped edges coincide, resistor films 19*b* provided to cover part of first recording electrode group 14*a* of substrate board 10 and second ink jet control electrode 18*b* face each other via oily ink 21 and that resistive films 19*a* provided to cover part of second recording electrode group 14*b* and first ink jet control electrode 18*a* face each other via oily ink 21.

First and second ink jet control electrodes 18*a* and 18*b*, like the formation of recording electrodes 13 and auxiliary electrodes 16*a* and 16*b*, were formed by vacuum depositing a metallic chromium layer to a thickness of 1,500 angstroms on the surface of upper board 11 and etching this film.

Substrate board 10 and upper board 11 obtained in the above way, were overlapped using spacer 12 obtained from a 100-$\mu$m thick polyethylene telephthalate film and bonded together using an epoxy resin adhesive, thus obtaining ink recording head 1.

As shown in FIGS. 1 and 2, cylindrical back electrode 2 was disposed such that it was spaced apart via recording sheet 6 and extended parallel to slit-like ink jet port 9 of ink recording head 1, and then ink reservoir 20 was filled with oily ink 21. Subsequently, the electric resistance between each of recording electrodes 13 and each of ink flying control electrodes 18*a* and 18*b* was measured using a needle-like probe in contact with recording electrode 13. Resistance Rc11 between first ink jet control electrode 18*a* and first recording electrode group 14*a* was $10^9\ \Omega$. Resistance Rc21 between first ink jet control electrode 18*a* and second recording electrode group 14*b* was $10^{10}\ \Omega$. Resistance Rc22 between second ink jet control electrode 18*b* and second recording electrode group 14*b* was $10^9\ \Omega$. Resistance Rc12 between second ink jet control electrode 18*b* and first recording electrode group 14*a* was $10^{10}\ \Omega$.

Thereafter, a copying machine was constructed such that photoconductive sections 15 formed on substrate board 10 were illuminated by light reflected from original 4 through a self-focusing lens as optical means 5. Then, an original was illuminated by light from a light source (not shown), and in this state, 250-Hz high voltage pulse signals as shown at $P_1$ and $P_2$ (with a peak of $-200$ V) and $P_1'$ and $P_2'$ (with a peak of $+200$ V) in FIG. 4 were applied respectively to ink flying control electrodes 18*a* and 18*b* and auxiliary electrodes 16*a* and 16*b* using electronic circuit shown in FIG. 3, while high voltage pulse signal BE with a peak value of $+2{,}000$ V, a frequency of 500 Hz and a pulse duration of 1 msec. was applied to back electrode 2. As a result, a clear copy image of original 4 consisting of oily ink 21 was formed on recording sheet 6.

EXAMPLE 2

A coping machine was produced in the same manner as in Example 1 except for that a 500 Å thick a—Si:N protective film was deposition formed in the same manner as for resistor films 19*a* and 19*b* over the entire surface of auxiliary electrodes 16*a* and 16*b* except for power supply sections thereof after the provision of recording electrodes 13, auxiliary electrode 16*a*, resistor films 19*a* and 19*b*, insulating film 17 and auxiliary electrode 16*b* on substrate board 10 in the same manner as in Example 1. This copying machine was operated to produce satisfactory copy images under the same recording conditions as in Example 1 even in an atmosphere at a temperature of 30° C. and with a relative humidity of 85%. Further, when the same high voltage pulse signals as in Example 1 were applied to ink jet control electrodes 18*a* and 18*b*, auxiliary electrodes 16*a* and 16*b* and back electrode 2 in the absence of light illuminating photoconductive sections 15, ink was caused to fly toward recording sheet 6 alternatively from the ends of first and second recording electrode groups 14*a* and 14*b*. Microscopic observation of the ends of recording electrodes 13 after a total of 100 hours of recording operation revealed no trace of electric field corrosion of recording electrode ends.

In this example, it was confirmed that the 500 Å thick a—Si:N protective film formed on substrate board 10 was effective in preventing permeation of the a—Si:H film provided as photoconductive sections 15 with water and also preventing in the generation of electric field corrosion between first and second recording electrode groups 14*a* and 14*b*.

EXAMPLE 3

A copying machine was produced in the same manner as in Example 1 using same ink recording head 1 as in Example 1 except for that the a—Si:H film formed in the same manner as for the a—Si:H film as described before in conjunction with Example 1 was used as the material of resistor films 19*a* and 19*b* converting part of first and second recording electrode groups 14*a* and 14*b* on substrate board 10 and insulating film 17 covering auxiliary electrode 16*a*. With this copying machine, satisfactory copy images coupled be obtained by ink jet copying.

As has been shown, with the copying machine according to the invention it is possible to cause high voltage application to adjacent recording electrodes 13 at different timings to realize ink jet recording of satisfactory quality without need of complicated wiring of electrodes.

The photoconductive sections may be made of a material which mainly consists of Si atoms and contains Ge or halogen atoms. Further, photoconductive materials which mainly consist of Si atoms and contain slight quantities of borom (B) or phosphorus (P) atoms may be used suitably for the invention. Further, a—Si:H, GaAs and ZnSe containing fine silicon crystals, which are obtainable by causing the deposition of a plasmic reaction product on a substrate heated to approximately 400° C. by inducing plasma discharge in a mixture gas consisting of silane gas ($SiH_4$) and hydrogen gas, are highly photoconductive and suited for the invention.

The GaAs on substrate board 10, to be used for carrying out the invention, like the deposition of the a—Si:H film, can be obtained by causing a reaction of $Gs(CH_3)_3$ gas and $AsH_3$ gas by causing glow discharge in in the atmosphere of the mixture of these gases. The ZnSe film can be obtained by causing a reaction of the mixture of $Zn(CH_3)_2$ gas and $SeH_2$ gas in the manner as described above.

As the material for resistor films 19*a* and 19*b* and insulating film 17 may be used, in addition to nitrogen-containing amorphous silicon (a—Si:N) and oxygen-containing amorphous silicon, highly insulating materials such as carbon-containing amorphous silicon (a—Si:C) and amorphous silicon containing nitrogen and carbon (a—SiCN) with a metal cover film for forming auxiliary electrode 16*b*.

The above materials may be produced by an ion plating process and a spattering process in addition to the ordinary plasmic reaction as shown above.

In the above examples of the invention, light reflected from original 4 was coupled through the self-focusing lens to illuminate photoconductive sections 15, but it is also possible to use an optical system using a mirror or a lens, through which to illuminate light from the original. In this case, an ink jet duplicator capable of enlargement and contraction can be constructed. Further, it is possible to construct an ink jet printer by having highly densely arranged LED elements in close contact with photoconductive sections 15 and permitting these LED elements to be on-off operated according to recording data or by disposing shutters consisting of a liquid crystal between the light source and photoconductive sections 15 and permitting these shutters to be opened and closed in correspondence to recording data.

Further, while in the above examples auxiliary electrodes 16a and 16b were provided separately via insulating film 17, it is possible to use a single common auxiliary electrode by setting the cycle period of second high voltage pulse application to auxiliary electrode to be double the first high voltage pulse application cycle period.

Figure 9:
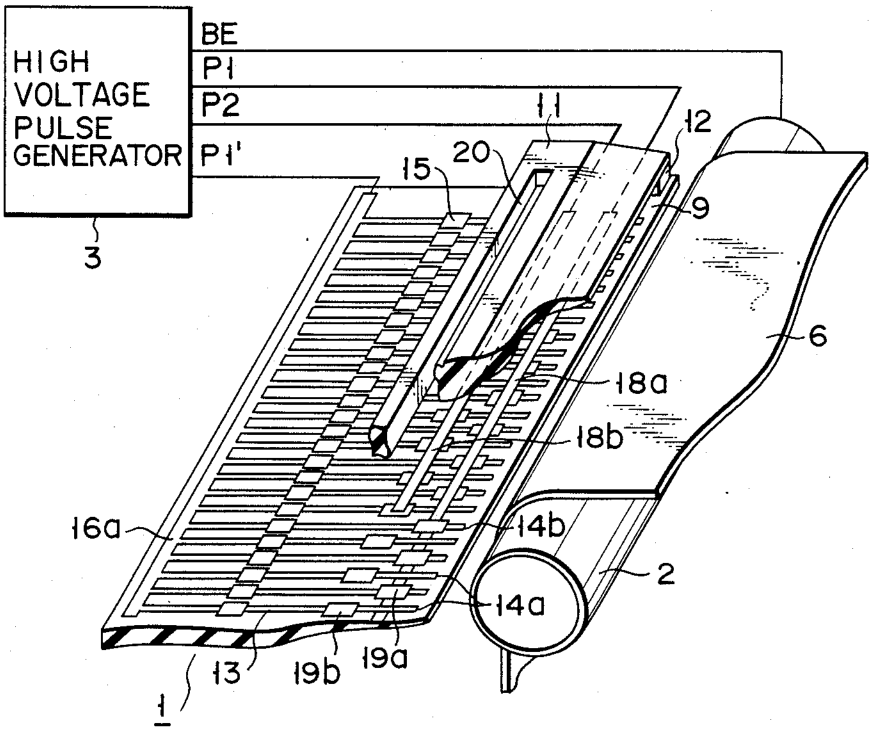
FIG. 9 is a perspective view, partly broken away, showing a different embodiment of the electrostatic acceleration type ink jet recorder according to the invention.
Figure 10:
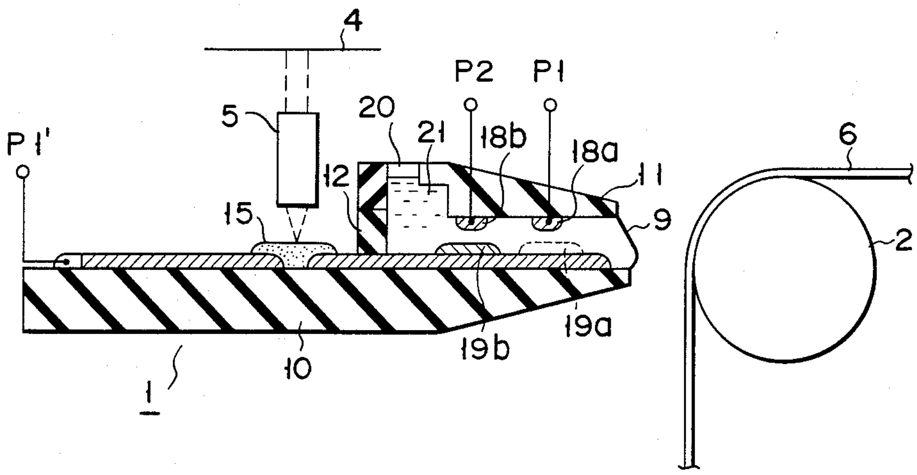
FIG. 10 is a schematic sectional view showing the recorder shown in FIG. 9.

Now, another embodiment of the ink jet system according to the invention will be described with reference to FIGS. 9 to 14A and 14B. In FIGS. 9 to 14A and 14B, reference numerals like those in FIGS. 1 to 8 designate like parts or portions, and detailed description thereof will be omitted. The system shown in FIGS. 9 and 10, unlike the system shown in FIGS. 1 and 2, a plurality of recording electrodes 13, which belong to either one of two groups, the recording electrodes in each group being not adjacent to any recording electrode in the other group, e.g., first recording electrode group 14a consisting of odd recording electrodes and second recording electrode group 14b consisting of even recording electrodes, are all commonly connected through photoconductive sections 15 to sections of comb-like auxiliary electrode 16a formed on substrate board 10. That is, the system shown in FIGS. 9 and 10 is free from insulating layer 17 and second auxiliary electrode 16b. For this reason, the high voltage pulse generator does not provide second high voltage pulse signal $P_2'$ which is to be supplied to second auxiliary electrode 16b.

Figure 11:
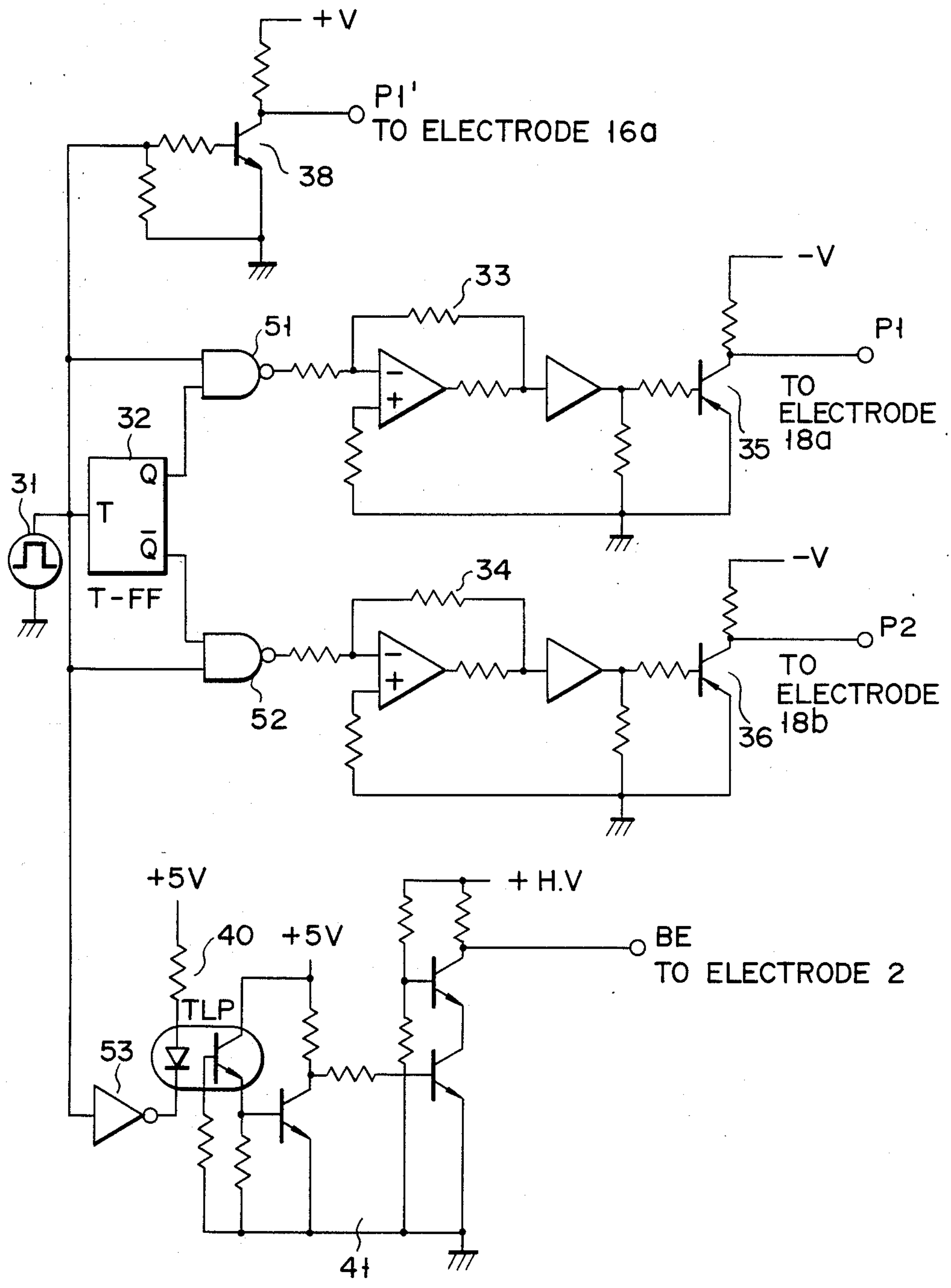
FIG. 11 is a circuit diagram showing a high voltage pulse generator shown in FIG. 9.
Figure 12:
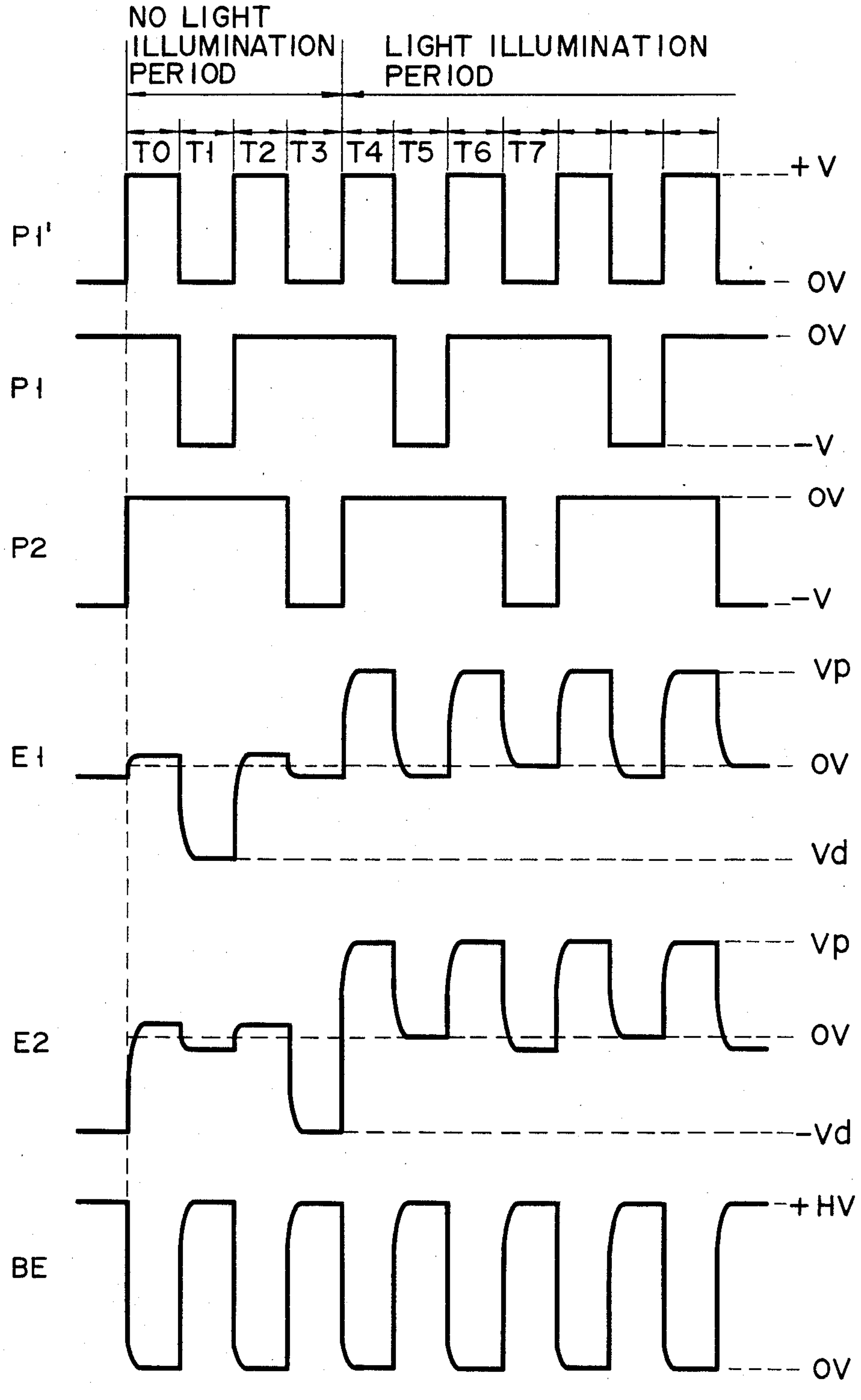
FIG. 12 is a waveform diagram showing waveforms involved in various parts of the circuit shown in FIG. 11.

High voltage pulse generator 3 in this embodiment has a circuit construction as shown in FIG. 11. Reference pulse signal T as shown in FIG. 12, is generated from pulse generator 31 and supplied to the base of power transistor 38, which has the emitter grounded and the collector connected through a resistor to power supply of V. Power transistor 38 thus is on-off operated according to reference pulse signal T and provides output $P_1'$ as shown in FIG. 12 from the collector. Reference pulse signal T is also supplied to toggle terminal T of T-type flip-flop 32 and NANDs 51 and 52. With the rising of reference pulse T, T-type flip-flop 32 provides inversion outputs from its Q and $\overline{Q}$ terminals. That is, pulse signals, each of which has one half the pulse repetition frequency of reference pulse signal T and 180 degrees out of phase with each other, are provided from the Q and $\overline{Q}$ terminals of flip-flop 32 and supplied to NANDs 51 and 52, to which reference pulse signal T is also supplied. The outputs of NANDs 51 and 52 are amplified by operational amplifiers 33 and 34 before being applied to the bases of power transistors 35 and 36, which each have the emitter grounded and the collector connected through a resistor to power supply of −V. Power transistors 35 and 36 are thus on-off operated according to the outputs of NANDs 51 and 52. Power transistors 35 and 36 thus provide from their collectors respective first high voltage pulse signals $P_1$ and $P_2$, which have a reverse polarity of output $P_1'$ are 180 degrees out of phase, i.e., shifted in a phase by an amount corresponding to the pulse width of reference pulse signal T and is changed from 0 to $-V_1$ volts. Reference pulse signal T from pulse generator 53 is supplied through inverter 53 and photocoupler 40 to amplifier 41 for conversion into high voltage pulse signal BE, which hs the same frequency as that of high voltage pulse signal $P_1'$ but is 180 degrees out of phase with respect to high voltage pulse signal $P_1'$. High voltage pulse signals $P_1$, $P_1'$, $P_2$ and BE are applied to first ink jet control electrode 18a, first auxiliary electrode 16a, second ink jet control electrode 18b and back electrode 2.

Now, the potentials on the recording electrodes belonging to first and second recording electrode groups 14a and 14b in the absence of light illuminating photoconductive sections 15 will be described.

During periods T0 to T3 shown in FIG. 12, during which photoconductive sections 15 are not illuminated by any light, the electric resistance between auxiliary electrode 16a and first and second recording electrodes 14a and 14b is Rd. During period T0, auxiliary electrode 16a is held at a potential of +V volts, while first and second ink jet control electrodes 18a and 18b are held in the grounded state, i.e., at 0 V. Thus, the applied voltage of +V volts is divided to the ratio of the resultant resistance of Rc11 and Rc12, i.e., Rc11·Rc12/(Rc11+Rc12), and Rd, that is, the ratio of the resultant resistance of Rc22 and Rc21, i.e., Rc21·Rc22/(Rc21+Rc22) and Rd. Since Rc11=Rc22 and Rc12=Rc21, (Rc11·Rc12/(Rc11+Rc12)<<Rd), first and second recording electrodes 14a and 14b are held at an equal and slightly positive potential.

During next period T1, only first ink jet control electrode 18a is held at a potential of −V volts, and second ink jet control electrode 18b and auxiliary electrode 16a are held in the grounded state. Thus, first recording electrode group 14a is held at a potential, which is a division of the voltage of −V volts to the ratio between the resultant resistance of Rd and Rc12, i.e., Rd·Rc12/(Rd+Rc12), add Rc11. Second recording electrode group 14b, on the other hand, is held at a potential, which is a division of the voltage of −V volts to the ratio between the resultant resistance of Rd and Rc22, i.e., Rd·Rc22/(Rd+Rc22) and Rc21. Since Rc11=Rc22<Rc12=Rc21<Rd, Rd·Rc12/(Rd+Rc12)>Rc11>Rd Rc22/(Rd+Rc22)<Rc21. This means that the potential on first recording electrode group 14a is closer to the potential of −V volts than the potential on second recording electrode group 14b does.

During period T2, first and second ink jet control electrodes 18a and 18b are in the grounded state as in period T0, and also auxiliary electrode 16a is at a potential of +V volts. Thus, the potentials on first and second recording electrode groups 14a and 14b are equal and, as in period T0, are slightly positive.

During period T3, second ink jet control electrode is held at a potential of −V volts, while first and second jet control electrode 18a and auxiliary electrode 16a are held in the grounded state. Second recording electrode group 14*b* thus is held at a potential, which is a division of the voltage of −V volts to the ratio of the resultant resistance of Rd and Rc21, i.e., Rd·Rc21/(Rd+Rc21) and Rc22. First recording electrode group 14*a*, on the other hand, is held at a potential, which is a division of the voltage of −V volts to the ratio of the resultant resistance of Rd and Rc11, i.e., Rd·Rc11/(Rd+Rc11) and Rc12. Since Rc11=Rc22<Rc12=Rc21<Rd, we have a relation Rd·Rc21/(Rd+Rc21)>Rc22>Rd·Rc11/(Rd+Rc11)-<Rc12. During period T3, therefore, in contrast to period T1, the potential on second recording electrode group 14*b* is cloeer to −V volts than the potential on first recording electrode group 14*a*.

Now, the potentials on first and second recording electrode groups 14*a* and 14*b* during periods T4 to T7, during which photoconductive sections 15 are illuminated by any light, will be described.

Since photoconductive sections 15 are illuminated by light, the electric resistance between first and second recording electrode groups 14*a* and 14*b* and ink jet control electrode 16*a* is reduced to Rp, which is very low compared to the electric resistance Rd between first and second recording electrode groups 14*a* and 14*b* and auxiliary electrode 16*a* in the absence of light illuminating photoconductive sections 15. This is the sole diffrrence, and equal voltages are applied to first and second ink jet control electrodes 18*a* and 18*b* and auxiliary electrode 16*a* during periods T0 and T4, during periods T1 and T5, during periods T2 and T6 and during periods T3 and T7. Thus, during period T4 first and second recording electrode groups 14*a* and 14*b* are held at potentials, which are divisions of the applied voltage of +V volts to the ratio of the resultant resistance of Rc11 and Rc12, i.e., Rc11·Rc12/(Rc11+Rc12) and Rp and to the ratio between the resultant resistance of Rc22 and Rc21, i.e., Rc21·Rc22/(Rc21+Rc22) and Rp. Since Rp<Rc11=Rc22<Rc12=Rc21, first and second recording electrode groups 14*a* and 14*b* are held at an equal potential close to +V volts.

During period T5, only first ink jet control electrode 18*a* is held at −V volts, and second ink jet control electrode 18*b* and auxiliary electrode 16*a* are in the grounded state. Thus, first recording electrode group 14*a* is held at a potential, which is a division of the voltage of −V volts to the ratio of the resultant resistance of Rp and Rc12, i.e., Rp·Rc12/(Rp+Rc12), and Rc11. Second recording electrode group 14*b*, on the other hand, is held at a potential, which is a division of the voltage of −V volts to the ratio of the resultant resistance of Rp and Rc22, i.e., Rp·Rc22/(Rp+Rc22). Since Rp<Rc11=Rc22<Rc12=Rc21, we have a relation Rp·Rc12/(Rp+Rc12)<Rc11>Rp·Rc22/(Rp+Rc22)<Rc21, and the potentials on first and second recording electrode groups 14*a* and 14*b* are both slightly negative. During period T6, like period T4, only ink jet control electrode 16 is held at +V volts, and first and second ink jet control electrodes 18*a* and 18*b* are held in the grounded state. Thus, the potentials on first and second recording electrode groups 14*a* and 14*b* are equal and close to +V volts as in period T4.

Figure 13A:
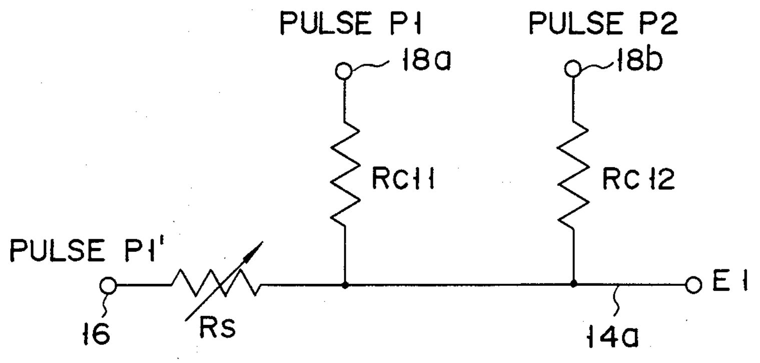
FIGS. 13A and 13B are circuit diagrams showing equivalent circuits concerning first and second auxiliary electrodes, recording electrodes and first and second ink jet control electrodes as shown in FIG. 9.
Figure 13B:
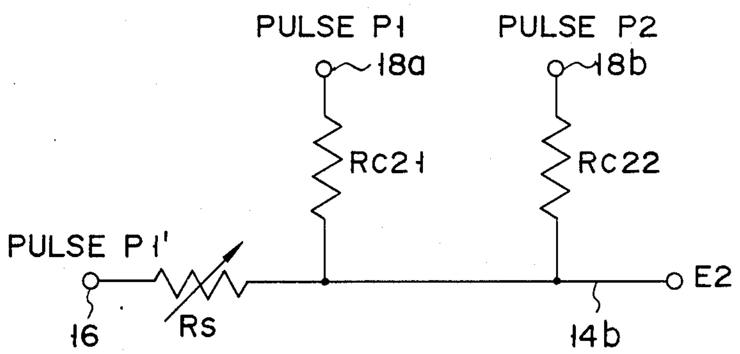
Figure 14A:
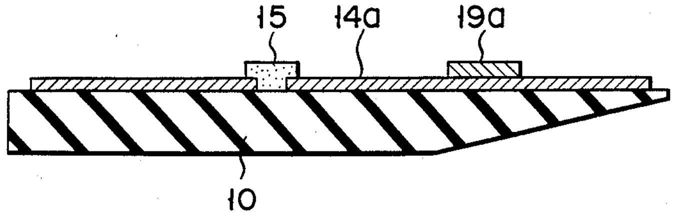
FIGS. 14A and 14B are views for explaining the process of fabrication of the ink jet system shown in FIG. 9.
Figure 14B:
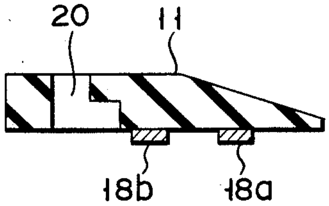

During period T7, like period T3, second ink jet control electrode 18*b* is held at −V volts, and first ink jet control electrode 18*a* and auxiliary electrode 16*a* are both held in the grounded state. Thus, second recording electrode group 14*b* is at a potential, which is a division of the voltage of −V volts to the ratio of the resultant resistance of Rp and Rc21, i.e., Rp·Rc21/(Rp+Rc21) and Rc22, and first recording electrode group 14*a* is held at a potential, which is a division of the voltage of −V volts to the ratio of the resultant resistance of Rp and Rc11, i.e., Rp·Rc11/(Rp+Rc11) and Rc 12. Since Rp<Rc11=Rc22<Rc12=Rc21, we have a relation Rp·Rc21/(Rp+Rc21)<Rc22>Rp·Rc11/(Rp+Rc11)<Rc12. The potentials on first and second recording electrode groups 14*a* and 14*b* thus are both slightly negative. The potentials on first and second recording electrode groups 14*a* and 14*b* are thus varied as shown at E1 and E2 in FIG. 12, respectively. FIG. 13 shows an equivalent circuit concerning recording electrodes 13, auxiliary electrode 16 and ink jet control electrodes 18*a* and 18*b*.

During periods T1, T3, T5 and T7, a high voltage of +HV as shown at BE in FIG. 12 is applied to back electrode 2. During period T1, the electric field intensity between first recording electrode 14*a* and back electrode 2 assumes a maximum value, and ink 21 in the vicinity of the ends of first recording electrodes 14*a* is jet toward back electrode 2 to form ink dots on recording sheet 6. During period T3, the electric field intensity between second recording electrode 14*b* and back electrode 2 assumes a maximum value, and ink 21 in the vicinity of the ends of second recording electrodes 14*b* is jet toward back electrode 2 to form ink dots on recording sheet 6. Although first and second recording electrodes 14*a* and 14*b* are adjacent to one another, ink is never simultaneously jet from both the electrodes. Thus electrostatic forces of repulsion of ink drops jetting toward recording sheet 6 are reduced, so that it is possible to obtain an image, which is faithful to the recording signal and is excellent in resolution.

As described above, by meeting a relation Rp<Rc11=Rc22<Rc12=Rc21=Rd where Rc11 is the electric resistance between each of first recording electrodes 14*a* in slit-like ink jet port 9 and first ink jet control electrode 18*a*, Rc12 is the electric resistance between each of second recording electrodes 14*b* and second ink jet control electrode 18*b*, Rc21 is the electric resistance between each of second recording electrodes 14*b* and first ink jet control electrode 18*a*, Rd is the electric resistance between each recording electrode 13 and auxiliary electrode 16*a* in the absence of light illuminating photoconductive sections 15 and Rp is the electric resistance between each recording electrode 13 and auxiliary electrode 16 in the presence of light illuminating photoconductive sections 15, it is possible to have the potentials on first and second recording electrodes 14*a* and 14*b* different from each other when a high voltage is applied to either one of first and second ink jet control electrodes 18*a* and 18*b*.

The relation Rp<Rc11=Rc22<Rc12=Rd, which is necessary for the invention, may be realized in the manner to be described hereinunder.

By partly increasing or reducing the width of the portions of first and second recording electrode groups 14*a* and 14*b* which overlap over first and second ink jet control electrodes 18*a* and 18*b* via ink layer 21, it is possible to vary the ratio between the area of the portions overlapping first ink jet control electrode 18*a* and the area of portions overlapping second ink jet control electrode 18*b*. This permits the relation Rc11=Rc22<Rc12=Rc21 to be readily met. Resistance Rc11 between first recording electrode group 14*a* and first ink jet control electrode 18*a* when upper board 11 and substrate board 10 are overlapped over each other via predetermined gap G (cm) is given as $$Rc11=\rho G/S11\ (\Omega)$$

where S11 ($cm^2$) is the area, in which the two electrodes overlap each other via an ink layer and $\rho$ ($\Omega$cm) is the volume resistivity of ink. Likewise, resistance Rc12 between first recording electrode group 14a and second ink jet control electrode 18b is given as $Rc12=\rho S12/G$.

Therefore, the relation $Rc11<Rc12$ can be met by making width W11 of the portions of recording electrode group 14a overlapping over first ink jet control electrode 18a to be greater than width W12 of the portions of recording electrode group 14a overlapping over second ink jet control electrode 18b such that $S11>S12$. Likewise, it is possible to resistance Rc22 between second recording electrode group 14b and second ink jet control electrode 18b and resistance Rc21 between second recording electrode group 14b and first ink jet control electrode 18a.

Further, it is possible to meet a condition $Rc11=Rc22<Rc12=Rc21$ by forming electric insulating films 19a and 19b having a higher resistivity than the resistivity of the ink on the portions of first recording electrode group 14a overlapping over second ink jet control electrode 18b via ink layer 21 and portions of second recording electrode group 14b overlapping first ink jet control electrode 18a via ink layer 21 so that these films cover first and second recording electrode groups 14a and 14b. By combining the above two methods, it is possible to meet the relation $Rc11=Rc22<Rc12=Rc21$ more reliably. Rp and Rd can be given as $$Rp=\rho p\cdot d/t\ W\ (\Omega)\ \text{and}$$

$$Rd=\rho p\cdot d/t\ W\ (\Omega)$$

where $\rho p$ ($\Omega$cm) and $\rho pd$ ($\Omega$cm) are respectively the volume resistivity of photoconductive sections 15 in the presence of light illuminating photoconductive sections 15 bridging recording electrodes 13 and auxiliary electrode 16 and that in the absence of any illuminating light, t (cm) is the thickness of photoconductive sections 15, d (cm) is the inter-electrode distance between the facing portions of recording electrodes 13 and auxiliary electrode 16 and W ($\Omega$) is the width of electrodes. Rp and Rd thus can be set desirably by appropriately setting the values of d, t and W.

To meet the relation $Rp<Rc11=Rc22<Rc12=Rc21<Rd$, the photoconductor to be used according to the invention is suitably one having a large difference between $\rho p$ and ld. An example of such photoconductor is hydrated amorphous silicon.

The high voltage pulse generator according to the invention is not limited to one as shown in FIGS. 3 and 11, and the switching transistor may obviously be replaced with a combination of an LC resonant circuit and a thyristor.

Now, preferred examples will be described with reference to the drawings.

EXAMPLE 4

Recording electrodes 13, auxiliary electrode 16 and photoconductive sections 15 were provided on slit-like ink jet port formation substrate board 10 obtained from a 2-mm thick glass plate, and slit-like ink jet port formation upper board 11, provided with first and second ink jet control electrodes 18a and 18b and ink reservoir 20, was overlapped via spacer 12 over and integrated with substrate board 10, whereby ink recording head 1 was obtained.

Substrate board 10 consisted of a rectangular glass plate with a short side dimension of 50 mm and a long side dimension of 80 mm, with one long side having a wedge-like pointed sectional profile with an angle of approximately 15°, as shown in FIG. 7A, formed by polishing from one side.

Upper board 11, like substrate board 10, consisted of a 2-mm thick rectangular glass plate with a short side dimension of 20 mm and a long side dimension of 100 mm and had a wedge-shaped long side obtained by polishing. It was also formed with a rectangular hole with a short side dimension of 2 mm and a long side dimension of 50 mm, the hole serving as ink reservoir 20.

Subsequently, first and second ink jet control electrodes 18a and 18b having a width of 3 mm, were formed by etching a 1,500 Å thick metallic chromium layer formed using a vacuum deposition apparatus on the surface of upper board 11 facing substrate board 10.

Recording electrodes 13 and auxiliary electrode 16 were obtained by etching a 1,500 Å thick metallic chromium layer formed using a vacuum deposition apparatus on the surface of substrate board 10.

As shown schematically in FIG. 9, recording electrodes 13 had partly varying widths. More particularly, the etching was done such that the width of the portions of recording electrodes 14a where first recording electrodes 14a overlap over first ink jet control electrode 18a via the ink layer was 80 $\mu$m, the width of the portions of recording electrodes 14a where first recording electrodes 14a overlap over second ink jet control electrode 18a via the ink layer was 4 $\mu$m, the width of the portions of recording electrodes 14b where second recording electrodes 14b overlap over second ink jet control electrode 18b via the ink layer was 80 $\mu$m, and the width of the portions of recording electrodes 14b where second recording electrodes 14b overlap over first ink jet control electrode 18a via the ink layer was 4 $\mu$m.

As is seen from FIGS. 9 and 10, the etching was performed such that each recording electrode 13 had its front and rear ends respectively spaced apart by approximately 10 $\mu$m and 25 mm from the wedge-shaped edge of substrate board 10 and that also the distance from the rear end of first recording electrode group 14a to the front end of sections of comb-like auxiliary electrode 16a and the distance from the rear end of second recording electrode group 14b to the front end of sections of comb-like auxiliary electrode 16a were both 40 $\mu$m.

Then, hydrogen-containing amorphous silicon (a—Si:H) was deposition formed using the glow discharge apparatus as shown in FIG. 8 to form photoconductive sections 15 bridging rear ends of recording electrodes 13 add free ends of sections of comb-like auxiliary electrode 16a.

The a—Si:H film was formed as follows. First, substrate board 10 was placed on sample support 103 also serving as glow discharge electrode provided in reaction vessel 101 of apparatus 100. Then, after evacuating reaction vessel 101, silane gas ($SiH_4$) was introduced into reaction vessel 101, and with the gas pressure therein held at approximately 1 Torr a glow discharge was introduced by supplying high frequency power at a frequency of 13.56 MHz between planar electrode 104 and sample support 103 provided in reaction vessel 101. In this way, the a—Si:N film was formed as a product of a plasmic reaction between the silane gas and nitrogen gas on substrate board 10. The silane gas was introduced into reaction vessel 101 at a rate of 100 cc/min., the pressure in reaction vessel 101 was set to 1 Torr, high frequency power of 200 W was used, and substrate board 10 was heated for the deposition of a—Si:H to a temperature of 250° C. using heater 105.

A a—Si:H film which was obtained by deposition on substrate board 10 for 15 minutes under the conditions noted above, had a thickness of approximately 2.0 μm. The electric resistance between each recording electrode 13 and auxiliary electrode 16a formed on slit-like ink jet port formation substrate board 10 with the a—Si:H film, was approximately $10^8 \Omega$ under an illumination intensity of 100 lux and approximately $10^{11} \Omega$ in the presence of illuminating light.

Ink jet control electrodes 18a and 18b were formed on slit-like ink jet port formation upper board 11 as follows. In order that ink jet control electrodes 18a and 18b respectively overlap increased width portions of recording electrodes 14a and 14b via oily ink 21 when overlapping upper board 11 over slit-like ink jet port formation substrate board 10 such that their wedge-shaped ends coincide, first and second ink jet control electrodes 18a and 18b were formed such that they were parallel, had a width of 3 mm and were spaced respectively by 2 and 8 mm from the wedge-shaped edge of upper board 11.

First and second ink jet control electrodes 18a and 18b, like recording electrodes 13 and auxiliary electrode 16, were formed by etching a 1,500 Å metallic chromium layer vacuum deposited on upper board 11.

Substrate board 10 and upper board 11 obtained in the above way were overlapped over each other via spacer 12 obtained from a 100-μm thick polyethylene telephthalate film and bonded together using an epoxy resin adhesive, thus obtaining ink recording head 1 having the shape as shown in FIG. 9.

Then, as shown in FIGS. 9 and 10, cylindrical back electrode 2 was disposed parallel to the slit-like ink jet port of ink recording head 1 via recording sheet 6, and ink reservoir 20 was filled with oily ink 21.

Subsequently, the electric resistance between each recording electrode 13 and each of ink jet control electrodes 18a was measured with a needle-like probe in contact with recording electrode 13. Resistance Rc11 between first recording electrode 14a and first ink jet control electrode 18a was $10^9$ Ω, resistance Rc12 between first recording electrode 14a and second ink jet control electrode 18b was $10^{10}$ Ω, resistance Rc22 between second recording electrode 14b and second ink jet control electrode 18b was $10^9$ Ω, and resistance Rc21 between second recording electrode 14b and first ink jet control electrode 18a aas $10^{10}$ Ω.

Subsequently, a copying machine was constructed as shown in FIG. 10, such that light reflected from original 4 was projected through a self-focusing lens as optical means 5 onto photoconductive sections 15 provided on slit-like ink jet formation substrate board 10. Then, with original 4 illuminated by light from a light source (not shown), high voltage pulse signals shown at $P_1$ and $P_2$ in FIG. 12 (with a peak value of −200 volts, a pulse width of 1 msec. and a pulse repetition period of 4 msec.) were applied to ink jet control electrodes 18a and 18b, a high voltage pulse signal P0 (with a peak value of +200 volts, a pulse width of 1 msec. and a pulse repetition period of 2 msec.) was applied to auxiliary electrode 16, and a high voltage pulse signal BE as shown in FIG. 12 (with a peak value of +2,000 volts, pulse a pulse width 1 msec. and a pulse repetition period of 2 msec.) was applied to back electrode 2 using an electric circuit hhown in FIG. 11. Consequently, a copy image of original 4 consisting of ink 21 was formed on recording sheet 6.

EXAMPLE 5

60-μm wide recording electrodes 13 and auxiliary electrode 16a were provided on slit-like ink jet port formation substrate board 10, and then portions of first and second recording electrodes 14a and 14b overlapping respective second and first ink jet control electrodes 18b and 18a formed on slit-like ink jet formation upper board 11 via oily ink 11 were covered by 4-μm thick nitrogen-containing amorphous silicon (a—Si:N) film. The film of nitrogen-containing amorphous silicon (a—Si:N) film, like the case of the hydrogen-containing amorphous silicon (a—Si:H) film, was formed using glow discharge apparatus 100 as shown in FIG. 7. More specifically, on sample support 10 also serving as glow discharge electrode provided in reaction vessel 101 of apparatus 100 was placed slit-like ink jet port formation substrate board 10. Then, after evacuating reaction vessel 101, silane gas ($SiH_4$) and nitrogen gas ($N_2$) were introduced respectively from silane gas ($SiH_4$) bomb 107 and nitrogen gas bomb 108 in a volume ratio of 1:6 through gas mixer 109 into reaction vessel 101. Then, with the gas pressure in reaction vessel 101 held at approximately 1 Torr glow discharge was induced by supplying high frequency power at a frequency of 13.56 MHz between planar electrode 104 and sample support 10 provided in reaction vessel 101, thereby forming the nitrogen-containing amorphous silicon (a—Si:N) film as a plasmic reaction product of the silane gas and nitrogen gas on slit-like ink jet port formation substrate board 10.

The nitrogen-containing amorphous silicon (a—Si:N) was selectively etched off to leave portions over the portions of first and second recording electrodes 14a and 14b overlapping respective second and first ink jet control electrodes 18b and 18a via oily ink 21. The selective etching of the nitrogen-containing amorphous silicon (a—Si:N) was done as follows. A resist film was formed on the nitrogen-containing amorphous silicon (a—Si:N) film, then slit-like ink jet port formation substrate board 10 was placed again on sample support 103 of glow discharge apparatus shown in FIG. 8, and then glow discharge was induced by introducing a mixture gas consisting of tetrafluoride methane gas ($CF_4$) and oxygen gas into reaction vessel 101. The distance from the rear end of recording electrodes 13 to the front end of the sections of comb-like auxiliary electrode 16 in this example was set to be 40 μm as in previous Example 1. Then, like Example 1 a hydrogen-containing amorphous sllicon (a—Si:H) was formed to bridge recording electrodes 13 and auxiliary electrode 16, thus obtaining ink recording head 1.

As for the electric resistance between recording electrodes 13 and ink jet control electrodes 18a and 18b of ink recording head 1 obtained in this way, resistance Rc11 between each first recording electrode 14a and ink jet control electrode 18a was $10^9$ Ω, resistance Rc12 between each first recording electrode 14a and second ink jet control electrode 18b was $5 \times 10^{10}$ Ω, resistance Rc22 between each second recording electrode 14b and second ink jet control electrode was $10^9$ Ω, and resistance Rc21 between each second recording electrode 14b and ink jet control electrode 18a was $5\times10^{10}$ Ω.

This copying machine was operated to obtain satisfactory copy images under the same conditions as Example 1 even in an atmosphere at a temperature of 30° C. and with a relative humidity of 85% and subject to ready changes in the resistivity of the oily ink.

EXAMPLE 6

An ink recording head was fabricated in the same manner as in Example 5 except for those portions of recording electrodes 13 in contact with oily ink 21 were covered by a 500 Å thick nitrogen-containing amorphous silicon, ad the same copying machine as shown in Examples 4 and 5 was produced. Then, in the absence of light illuminating photoconductive sections 15 of the copying machine, the same voltage pulse signals as in Example 4 were applied to ink jet control electrodes 18a and 18b, auxiliary electrode 16 and back electrode 2. In consequence, ink was caused to fly alternatively from the ends of recording electrodes 14a and 14b toward recording sheet 6. After performing recording operation for a total of 100 hours, the ends of the recording electrodes were observed using a microscope to recognize no trace of electrolytic corrosion at the ends of the recording electrodes. In contrast, with the ink recording head used in Example 4, trace of electrolytic corrosion was recognized at the ends of the recording electrodes after long-time recording. More specifically, the 500 Å thick nitrogen-containing amorphous silicon (a—Si:N) film provided on slit-like ink jet port formation substrate board 10 in the embodiment, has an effect of preventing the migration of water into the hydrated amorphous silicon (a—Si:H) provided on photoconductive sections 15 and generation of electrolytic corrosion occurring between recording electrodes 14a and 14b.

EXAMPLE 7

Recording electrodes 13 and auxiliary electrode 16 having the same shape as Example 4 were provided on slit-like ink jet port formation substrate board 10, and then portions of first and second recording electrodes 14a and 14b overlapping over second and first ink jet control electrodes 18b and 18a via oily ink 21, i.e., 4-μm wide portions of recording electrodes 14a and 14b, were covered by a 4-μm thick nitrogen-containing amorphous silicon (a—Si:N) film. The nitrogen-containing amorphous silicon (a—Si:N) film was deposited like the hydrogen-containing amorphous silicon (a—Si:H) film using glow discharge apparatus 100 shown in FIG. 8. More specifically, slit-like ink jet port of motion substrate board 10 was placed on sample support 103 also serving glow discharge electrode provided reaction vessel 101 of apparatus 100, then after evacuating reaction vessel 101 silane gas ($SiH_4$) and nitrogen gas ($N_2$) were introduced respectively from silane gas bomb 107 and nitrogen gas bomb 108 in a volume ratio of 1:6 through a gas mixer 109 into reaction vessel 101, and then with the gas pressure in reaction vessel 101 held at approximately 1 Torr glow discharge was induced by supplying high frequency power of 13.56 MHz between planar electrode 104 and sample support 103 also serving as glow discharge electrode in reaction vessel 101. Thus, the nitrogen-containing amorphous silicon (a—Si:N) film was formed as a product of plasmic reaction product between silane gas ($SiH_4$) and nitrogen gas ($N_2$).

The nitrogen-containing amorphous silicon (a—Si:N) film was selectively etched off to leave portions other than the portions through which first and second recording electrodes 14a and 14b are faced to respective first and second ink jet control electrodes 18a and 18b. The selective etching of the nitrogen-containing amorphous silicon (a—Si:N) was done as follows. A resist film was formed on the nitrogen-containing amorphous silicon (a—Si:N), then slit-like ink jet port formation substrate board 10 was placed on sample support 103 of glow discharge apparatus 100 as shown in FIG. 8, and glow discharge was induced by introducing a mixture gas consisting of tetrafluoride methane gas ($CF_4$) and oxygen gas ($O_2$) into reaction vessel 101. Then, an ink jet copying machine which was entirely the same as in Example 4 except for a nitrogen-containing amorphous silicon (a—Si:N) was formed on predetermined portions of recording electrodes 14a and 14b. As for the electric resistance between recording electrodes 13 and ink jet control electrodes 18a and 18b of the copying machine, resistance Rcll between first recording electrode 14a and first ink jet control electrode 18a was $10^9$ Ω, resistance Rc12 between first recording electrode 14a and second ink jet control electrode 18b was $10^{10}$ Ω, resistance Rc22 between second recording electrode 14b and second ink jet control electrode 18b was $10^9$ Ω, and resistance Rc21 between second recording electrode 14b and first ink jet control electrode 18a was $10^{10}$ Ω.

This copying machine was operated to obtain satisfactory copy images under the same conditions as in Example 4 even in an atmosphere at a temperature of 30° C., with a relative humidity of 85% and readily subject to changes in the resistivity of oily ink 21.

As has been described in detail in connection with the prior art and examples, the ink jet copying machine of electrostatic acceleration type according to the invention makes use of a change in the conductivity of the photoconductive sections connected to recording electrodes induced by illumination of the photoconductors by light for changing the recording electrode potential in the form of pulses. The photoconductive section may be made of materials consisting of Si atoms as base material and containing Ge atoms or halogen atoms as well as hydrated amorphous silicon (a—Si:H), and materials consisting of Si atoms as base material and slightly containing B atoms and P atoms may be also used for photoconductive section suited for the invention. Further, hydrated amorphous silicon (a—Si:H) containing fine crystals of silicon obtained by inducing plasma discharge in a mixture gas consisting of silane gas ($SiH_4$) and hydrogen gas ($H_2$) and causing deposition of a resultant plasmic reaction product on a substrate heated to approximately 400° C. as well as GaAs and ZnSe is highly photoconductive and can be used for the invention.

The deposition of the GaAs film on hhe slit-like ink jet port formation substrate board 10 used for the invention, like the deposition of the hydrated amorphous silicon (a—Si:H), was obtained by causing reaction of $Ga(CH_3)_3$ gas and $AsH_3$ gas through glow discharge caused in the atmoshhere of the mixture gas of these two gases. The ZnSe film was obtained by causing reaction of $Zn(CH_3)_3$ gas and $SeH_2$ gas in the same manner as above.

The material of insulating films 19a and 19b may be highly electrically insulating films of carbon-containing amorphous silicon (a—Si:C) and amorphous silicon containing nitrogen and carbon (a—SiCN) as well as nitrogen-containing amorphous silicon (a—Si:N) and carbon-containing amorphous silicon (a—Si:C) as shown in the examples of the invention. These materials may be obtained by the ion plating process and spattering process in addition to the ordinary plasmic reaction used in the above embodiment.

Further, in the above examples the light reflected from the original is directed to the photoconductive sections through the self-focusing lens, but it is also possible to use an optical system using a mirror or a lens for projecting the light reflected from the original. In this case, it is possible to construct an ink jet copying machine capable of enlargement and contraction. Further, it is possible to construct ink jet printers where LED elements arranged at a high density above photoconductive sections are on-off operated according to recording data, or shutters consisting of a liquid crystal or the like and provided between a light source and photoconductive sections are on-off operated according to recording data.

In the ink jet system according to the invention, recording electrodes 14*a* and 14*b* on the end of substrate board 10 are covered by insulating film 55. Since recording electrodes are covered by insulating layer 55, even if a wave is generated on the surface of ink at the ink jet port when a high pulse voltage is applied between recording electrodes 14*a* and 14*b* and back electrode 2 to expose the substrate board surface, recording electrodes 14*a* and 14*b* are not directly exposed to air, and it is possible to produce a spark discharge with respect to back electrode 2.

It was confirmed that no spark discharge was produced with the formation of insulating films and recording films.

EXAMPLE 8

Figure 15:
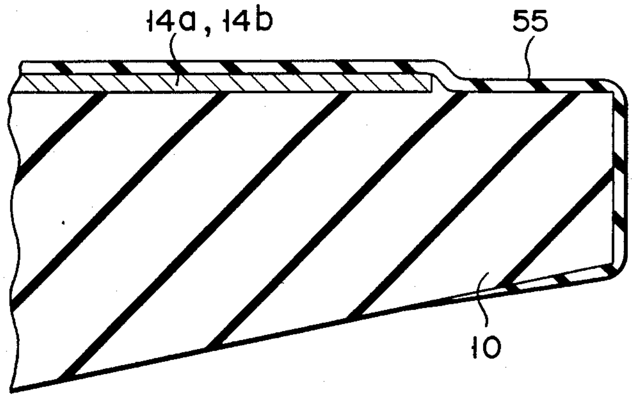
FIG. 15 is a sectional view showing a modification of a substrate in the ink jet system.

Recording electrodes 13 having a width of 60 μm and arranged at a pitch of 125 μm were formed on substrate board 10 made of glass by forming and selectively etching a 1,500 Å metallic chromium layer. Recording electrodes 13, as shown in FIG. 15, were formed such that they are spaced apart by approximately 30 μm from polished wedge-shaped end 18 of substrate board 10. The surface of recording electrodes 13 was covered by 1,000 Å thick insulating film 55 of $Si_3N_4$ formed by the plasmic polymerization reaction.

Upper board 11 was placed over substrate board 10 having the above structure via spacer 12, and these components were integrated using an epoxy resin adhesive, thus obtaining ink recording head 1. Back electrode 2 of stainless steel and having a diameter of 20 mm was disposed such that it is disposed by a distance of 0.4 mm from slit-like ink jet port 9 of ink recording head 1, and ink reservoir 20 was filled with oily ink 21 wtth an electric conductivity of $10-9\ \Omega^{-1}/cm^{-1}$. A high voltage pulse signal having a pulse width of 0.5 msec., a peak value of +2,000 V and a repetition frequency of 1 kpps was applied to back electrode 2. No spark discharge occurred between recording electrode 13 and back electrode 2 until +2,600 V was reached by the peak value of the high voltage pulse signal applied to back electrode 2.

EXAMPLE 9

Ink reoording head 1 was fabricated in the same manner as in Example 4 except for that recording electrodes 13 were spaced apart by 5 μm from end face 20 and that a—Si:C insulating film 55 with a thickness of 2 μm was formed by plasmic polymerization reaction on the surface of recording electrodes 13. With a copying machine using this ink recording head, no spark discharge occurred even by increasing the potential difference between recording electrodes 13 and back electrode 2 to 2,900 V.

EXAMPLE 10

Ink recording head 1 was fabricated in the same manner as in Example 2 except for that 500 Å SiN insulating film 14 was formed by plasmic polymerization reaction on the surface of recording electrodes 13. With a copying machine using this ink recording head, no spark discharge occurred by increasing the potential difference between recording electrodes 13 and back electrode 2 to 2,350 V.

It was confirmed that in the above examples it is possible to effectively prevent spark discharge between recording electrodes 13 and back electrode 2 by covering the surface of recording electrodes 13 with insulating film 55.

It is obvious that it is not essential to provide the recording electrodes such that their ends are on the inner side of the end face of substrate board 10. In the above examples, recording electrodes 13 are provided such that their ends are on the inner side of end face 13 of substrate board 13. Thus, the end portions of recording electrodes 10 were covered not only by insulating film 55 but also by oily ink 20, whereby it is possible to obtain the effect of spark discharge prevention. The end of recording electrodes 13 is suitably spaced apart by 5 to 300 μm from the end of the substrate board.

The recording electrodes 13 may be made of other insulating materials as $Si0_2$, $Ti0_2$, $Al_2O_3$, BN and AlN instead of Sic and SiN to obtain the same effects.

What is claimed is:

1. An ink jet system comprising:

an insulating substrate board having one end;

a plurality of main electrode formed on said insulating substrate board such that they extend toward said end;

means, disposed on said substrate board, for defining an ink reservoir accommodating ink and a slit-like ink jet port communicating with said ink reservoir and extending along said end of said insulating substrate board;

a control electrode facing saidmain electrodes in said ink reservoir and extending along said end of said insulating substrate board;

auxiliary electrodes arranged corresponding to said main electrodes and extending on said substrate board outside said in reservoir;

photoconductive members provided on said substrate board and connecting said main electrodes to said auxiliary electrodes outside said ink reservoir and providing resistance capable of being changed when said members are exposed to light;

back electrode means facing said ink jet port via a gap, ink being jetted from said ink jet port through said gap; and means for supplying voltage signals to said control electrode, auiliary electrode and back electrode means, a voltage signal having a periodically varying level being supplied to one of said control electrode and auxiliary electrode, the potential on main electrodes being varied according to voltage signals supplied to said control electrode and auxiliary electrode, ink on said main electrodes being jetted toward said back electrode when a predetermined value is reached by the potential difference between the potential on said back electrode means and potential on said main electrodes.

2. The ink jet system according to claim 1, wherein said means for supplying voltage signals generates voltage signals having one and reversed polarities to said control electrode and auxiliary electrode, respectively.

3. The ink jet system according to claim 1, whrrein means for supplying voltage signals applies signals synchronized with each other and having one and reversed polarities, respectively to said contool electrode and auxiliary electrode.

4. The ink jet system according to claim 3, wherein the level of voltage signals applied to said control electrode and auxiliary electrode varies periodically between ground potential and negative potential and between ground potential and positive potential.

5. The ink jet system according to claim 1, wherein said means for supplying voltage signals applies high voltage signals synchronized to one of said voltage signals supplied to said control electrode and auxiliary electoode to said back electrode means.

6. The ink jet system according to claim 1, wherein said auxiliary electrodes are commonly connected.

7. The ink jet system according to claim 1, wherein part of said main electrodes in the neighborhood of said end of said substrate board and the surface thereof are covered by an insulating layer.

8. The ink jet system according to claim 7, wherein said insulating layer is made of one selected from the group consisting of $SiO_2$, SiN, SiC, $TiO_2$, BN and AlN.

9. The ink jet system according to claim 7, wherein said insulating layer has a thickness ranging from 500 Å to 2 microns.

10. The ink jet system according to claim 7, wherein said main electrodes each have one end located in the proximity of, and spaced apart by a distnnce in a range of 5 to 300 microns from, said end of said substrate board.

11. The ink jet system according to claim 1, wherein ink is jetted toward said back electrode by means for supplying an optical signal to said photoconductive members according to recording data and an electric field produced between said main electrodes connected to the photoconductive members receiving an optical signal supplied thereto and back electrode means.

12. The ink jet system comprising:

an insulating substrate board having one end;

first and second main electrodes formed on sadd substrate board such that they extend toward said end, said first and second main electrodes being arranged alternately;

means, disposed on said substrate board, for defining an ink reservoir accommodating ink and an ink jet port communicating with said ink reservoir and extending along one end of said insulating substrat board;

first and second control electrodes facing said main electrodes via ink in said ink reservoir and extending along said end of said insulating substrate board;

means forpproviding predetermined resistance having values R11, R12, R22 and R21 between first and second main electrodes and said first and second control electrodes, the resistance R11 between the first main electrode and said first control electrode being lower than the resistance R12 between the first main electrode and said second control electrode, the resistance R22 between the second main electrode and second control electrode being lower than the resistance R21 between the second main electrode and said first control electrode;

first and second auxiliary electrodes provided in correspondence to the first and second main electrodes, respectively and extending on said substrate board outside said ink reservoir;

photoconductive members provided on said substrate board for connecting said main electrodes to auxiliary electrodes outside said ink reservoir, the resistance of said photoconductive members being changed when said members are exposed to light;

back electrode means facing said ink jet port via a gap, ink being jetted from said ink jet port through said gap;

control pulse signal generating means for supplying first and second control pulse signals to said first and second control electrodes, said first and second control pulse signals being 180-degrees out-of-phase with respect to each other and having the same and reversed polarities, respectively;

means for supplying first and second reference pulse signals to said first and second auxiliary electrodes, respectively said first and second reference pulse signals being 180-degrees out-of-phase with respect to each other and having reverse polarities to that of said first and second control pulse signals; and means for supplying a high voltage signal to said back electrode means, potentials on the first and second main electrodes being varied in 180-degree out-of-phase relation to each other according to the voltage signals supplied to said control electrodes and auxiliary electrodes, ink on said main electrodes being jetted toward the back electrode means when a predetermined value is reached by the potential difference between the potentials on said back electrode means and potential on themmain electrodes.

13. The ink jet system according to claim 12, wherein said means for supplying a high voltage signal generates a high voltage pulse signal.

14. The ink jet system according to claim 12, wherein said high pulse signal has a twice cycle period as that of said first and second reference signals.

15. The ink jet system according to claim 12, wherein the level of said control signals and reference signals is varied between ground potential and negative potential and between ground potential and positive potential.

16. The ink jet system according to claim 12, wherein said first and second auxiliary electrodes are commonly connected to said first and second main electrode, respectively.

17. The ink jet system according to claim 12, wherein portions of the miin electrodes in the neighborhood of said end of said substrate board and the surface thereof are covered by an insulating layer.

18. The ink jet system according to claim 17, wherein said insulating layer is made of a member selected from a group consisting of $SiO_2$, SiN, SiC, $TiO_2$, $Al_2O_3$, BN and AlN.

19. The ink jet system according to claim 17, wherein said insulating layer has a thickness in a range between 500 Å and 2 microns.

20. The ink jet system according to claim 17, wherein said main electrodes each have an end located in the proximity of, and spaced apart by a distance in a range of 5 to 300 microns from, said end of said substrate board.

21. The ink jet system according to claim 12, which further comprises:

means for supplying an optical signal to said photoconductive members according to recording data, ink being jetted toward said back electrode means by an electric field produced between the main electrodes connected to the photoconductive members and said back electrode means.

22. The ink jet system according to claim 12, which further comprises:

an insulating layer formed on said substrate board and first auxiliary electrode, said second auxiliary electrode extending over said insulating layer, said first auxiliary electrode being connected commonly on said substrate board, said second auxiliary electrode means being connected commonly on said insulating layer.

23. The ink jet system according to claim 12, which further comprises:

an optical system for leading light reflected from an original to said photoconductive members.

24. The ink jet system comprising:

an insulating substrate board having one end;

first and second main electrodes disposed on said substrate board such that they extend toward said end, said first and second main electrodes being arranged alternately;

means, disposed on said substrate board, for defining an ink reservoir accommodation ink and an ink jet port communicating with said ink reservoir communicating with said ink reservoir and extending along one end of said insulating substrate board;

first and second control electrodes facing said main electrodes via ink in said ink reservoir and extending along said end of said insulating substrate board;

means for providing predetermined resistances having values R11, R12, R22 and R21 between first and second main electrodes and said first and second control electrodes, the resistance R11 between the first main electrode and said first control electrode being lower than the resistance R12 between the first main electrode and said second control electrode, the resistance R21 between the second main electrodes and said first control electrode being higher than the resistance R22 between the second main electrode and said second control electrode;

first and second auxiliary electrodes provided in correspondence to the first and second main electrodes, respectively and extendin on said substrate board outside said ink reservoir;

photoconductive members provided on said substrate board for connecting said main electrodes to auxiliary electrodes outside said ink reservoir, the resistance of said photoconductive members being changed when said members are exposed to light;

back electrode means facing said ink jet port via a gap, ink being jetted from said ink jet port through said gap;

means for supplying a reference pulse signal to each of said first and second auxiliary electrodes;

control pulse signal generating means for supplying first and second control pulse signals to said first and second control electrodes, saidffirst and second control pulse signals being out-of-phase in phase difference corresponding to the cycle period of said reference signal and having reverse polarities to said reference signal; and means for supplying a high voltage signal to said back electrode means, potentials on the first and second main electrodes being varied in 180-degree out-of-phase relation to each other according to the voltage signals supplied to said control electrodesaand auxiliary electrodes, ink on said main electrodes being jetting toward the back electrode means when a predetermined value is reached by the potential difference between the potentials on said back electrode means and potential on the main electrodes.

25. The ink jet system according to claim 24, wherein said means for supplying a high voltage signal generates a high voltage pulse signal.

26. The ink jet system according to claim 24, wherein said high pulse signal has a twice cycle period as that of said first and second reference signals.

27. The ink jet system according to claim 24, wherein the level of said control signals and reference signals is varied between ground potential and negative potential and between ground potential and positive potential.

28. The ink jet system accordigg to claim 24, wherein said first and second auxiliary electrodes are commonly connected.

29. The ink jet system according to claim 24, wherein portions of the main electrodes in the neighborhood of said end of said substrate board and the surface thereof are covered by an insulating layer.

30. The ink jet system according to claim 24, wherein said insulating layer is made of a member selected from a group consisting of $SiO_2$, SiN, SiC, $TiO_2$, $Al_2O_3$, BN and AlN.

31. The ink jet system according to claim 24, wherein said insulating layer has a thickness in a range between 500 Å and 2 microns.

32. The ink jet system according to claim 24, wherein said main electrodes each have an end located in the proximity of, and spaced apart by a distance in a range of 5 to 300 microns from, said end of said substrate board.

33. The ink jet system according to claim 24, which further comprises:

means for supplying an optical signal to said photoconductive members according to recording data, ink being jetted toward said back electrode means by an electric field produced between the main electrodes connected to the photoconductive members receiving an optical signal and said back electrode.

34. The ink jet system according to claim 24, which further comprises:

an optical system for leading light reflected from the original to said photoconductive members.

35. The ink jet system according to claim 24, wherein the leading and trailing edges of said reference signal coincide with one of the leading and trailing edges of said first and second signals.

36. The ink jet system according to claim 24, wherein said means for providing predetermined resistances provides resistances satisfying a relation $$Rp < R11 = R22 < R12 = R21 < Rd$$

where Rp is the resistance between auxiliary electrode and main electrode when said photoconductive members are exposed to light, and Rd is the resistance between the auxiliary electrode and the main electrode when said photoconductiee members are not exposed to light.

37. The ink jet system according to claim 24, wherein the first main electrode and said first control electrode have a first main electrode segment and a first control electrode segment, respectively, facing each other and each having an area S11, the second main electrode and said second control electrode have a first main electrode segment and a second control electrode segment, respectively, facing each other and each having an area S12, the second main electrode and said second control electrode have a third main electrode segment and a third control electrode segment, respectively, facing each other and each having an area S22, and the second main electrode and said first control electrode have a fourth main electrode segment and a fourth control electrode segment facing each other and each having an area S21, said areas of the segments satisfying a relation $$S11=S22<S21=S12.$$

38. The ink jet system according to claim 24, wherein the first main electrode has a first main electrode segment facing said first control electrode, a first resistor segment layer is formed on said first main electrode segment, the first main electrode has a second main electrode segment facing said second control electrode, a second resistor segment layer is formed on said second main electrode segment, the second main electrode has a third main electrode segment facing said first control electrode, a third resistor segment layer is formed on said third main electrode segment, the second main electrode has a fourth main electrode segment facing said second control electrode, a fourth resistor segment layer is formed on said fourth main electrode segment, and said first to fourth resistor layers satisfying a relation $$R11=R22<R12=R21.$$

* * * * *